US010632377B2

(12) United States Patent
Fujinaga et al.

(10) Patent No.: US 10,632,377 B2
(45) Date of Patent: Apr. 28, 2020

(54) COMPUTER-READABLE RECORDING MEDIUM AND GAME SYSTEM

(71) Applicant: SQUARE ENIX CO., LTD., Tokyo (JP)

(72) Inventors: Kensei Fujinaga, Tokyo (JP); Daisuke Kobayashi, Tokyo (JP); Yoshihiro Ueno, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 15/678,563

(22) Filed: Aug. 16, 2017

(65) Prior Publication Data

US 2018/0050272 A1 Feb. 22, 2018

(30) Foreign Application Priority Data

Aug. 18, 2016 (JP) .................................. 2016-160890

(51) Int. Cl.
*A63F 13/352* (2014.01)
*A63F 13/70* (2014.01)
(Continued)

(52) U.S. Cl.
CPC ............ *A63F 13/352* (2014.09); *A63F 13/60* (2014.09); *A63F 13/70* (2014.09); *A63F 13/795* (2014.09);
(Continued)

(58) Field of Classification Search
None
See application file for complete search history.

(56) References Cited

U.S. PATENT DOCUMENTS 9,005,002 B2\* 4/2015 Oochi ...................... A63F 9/24
463/16
2011/0230267 A1\* 9/2011 Van Luchene .......... A63F 13/77
463/42
(Continued)

FOREIGN PATENT DOCUMENTS

JP 2006-26237 A1 2/2006
JP 2014-087509 A 5/2014
(Continued)

OTHER PUBLICATIONS

Japanese Office Action issued in Japanese Patent Application No. 2016-160890, dated Jul. 11, 2017, with a partial English translation.
(Continued)

*Primary Examiner* — James S. McClellan
*Assistant Examiner* — Peter J Iannuzzi
(74) *Attorney, Agent, or Firm* — Greenblum & Bernstein, P.L.C.

(57) ABSTRACT

A non-transitory computer-readable recording medium having a game program executed by a server device, in a game system which is realized by a plurality of user terminals operated by respective users and the server device capable of being connected to the plurality of user terminals through communication, the program causing the server device to function as: a game medium setter that sets one or more kinds of game media to be in a state of being capable of being given to a plurality of users; an upper limit setter that sets a predetermined upper limit to a number of game media capable of being given to the plurality of users; and a game medium giver that gives a user a game medium that the user desires to be given among the game media which are set by the game medium setter in a range not exceeding the predetermined upper limit.

13 Claims, 13 Drawing Sheets

(51) Int. Cl.
*A63F 13/335* (2014.01)
*A63F 13/60* (2014.01)
*A63F 13/795* (2014.01)
*A63F 13/798* (2014.01)

(52) U.S. Cl.
CPC .......... *A63F 13/798* (2014.09); *A63F 13/335* (2014.09); *A63F 2300/558* (2013.01); *A63F 2300/5533* (2013.01); *A63F 2300/5566* (2013.01); *A63F 2300/575* (2013.01)

(56) References Cited

U.S. PATENT DOCUMENTS

| | | | |
|---|---|---|---|
| 2014/0243088 A1 | 8/2014 | Oikawa | |
| 2015/0379824 A1* | 12/2015 | Kuroda | G07F 17/3293 463/16 |

FOREIGN PATENT DOCUMENTS

| | | |
|---|---|---|
| JP | 2014-161518 | 9/2014 |
| JP | 2015-015974 A | 1/2015 |
| JP | 2015-070970 | 4/2015 |
| JP | 5841275 B1 | 1/2016 |
| JP | 2016-016243 A | 2/2016 |
| JP | 5859700 B | 2/2016 |
| JP | 2016-067531 | 5/2016 |

OTHER PUBLICATIONS

Dragon Quest X, housing system <http://d-quest10.net/capture/housing.html> with a partial English translation.

User-generated content site for information of Render Hills (Render Sheer House Village) additionally edit <http://dq10memo.com/47495091/>, with a partial English translation.

Retoro, "Phantasy Star Online 2, Dengeki" PlayStation vol. 20, Issue 23, Kadokawa Corporation, Jun. 12, 2014, pp. 196-199, along with a partial English translation thereof.

Office Action issued in Japan Patent Appl. No. JP2017-253929, dated Nov. 13, 2018, along with a parital English translation thereof.

May 28, 2019 Decision of Refusal in corresponding Japanese Application No. 2017-253929 and English translation.

* cited by examiner

COMPUTER-READABLE RECORDING MEDIUM AND GAME SYSTEM

CROSS REFERENCE TO RELATED APPLICATION

The present disclosure relates to subject matter contained in Japanese Patent Application No. 2016-160890, filed on Aug. 18, 2016, the disclosure of which is expressly incorporated herein by reference in its entirety.

BACKGROUND OF THE INVENTION

Field of the Invention

The present invention relates to a game program and a game system.

Description of Related Art

An example of a method of giving a user a game medium used in a game includes a method of using a mechanism, called so-called gacha, in which lottery drawing is performed on a plurality of game media on the basis of predetermined lottery drawing probability, and a game medium determined by lottery drawing is given to a user (see, for example, JP-A-2016-67531).

SUMMARY OF THE INVENTION

Technical Problem

However, game media which are given to a user by the lottery drawing as described above are randomly determined on the basis of predetermined lottery drawing probability. For this reason, even in a case where a user performs several times of lottery drawing, the user does not necessarily obtain a desired game medium. As a result, a sense of dissatisfaction is given to the user, which may lead to a decrease in the user's interest in a game.

An object of at least one embodiment of the invention is to provide a game program capable of giving a game medium to a user using a new method alternative to lottery drawing of the related art.

Solution to Problem

According to a non-limiting aspect, a non-transitory computer-readable recording medium having recorded thereon a game program, executed by a server device, in a game system which is realized by a plurality of user terminals operated by respective users and the server device capable of being connected to the plurality of user terminals through communication, the program causing the server device to function as: a game medium setter that sets one or more kinds of game media to be in a state of being capable of being given to a plurality of users; an upper limit setter that sets a predetermined upper limit to a total number of game media capable of being given to the plurality of users; a game medium giver that gives a user a game medium that the user desires to be given among the game media which are set by the game medium setter in a range not exceeding the predetermined upper limit; and a counter that counts a total number of game media given to the plurality of users or a remaining number of game media capable of being given to the plurality of users by the game medium giver.

According to a non-limiting aspect, a game system which is realized in a plurality of user terminals operated by respective users and a server device capable of being connected to the plurality of user terminals through communication, the game system comprising: a game medium setter that sets one or more kinds of game media to be in a state of being capable of being given to a plurality of users; a game medium displayer that displays a game medium which is set to be in a state of being capable of being given to the plurality of users, to a user; an upper limit setter that sets a predetermined upper limit to a number of game media capable of being given to the plurality of users; a game medium giver that gives a user a game medium that the user desires to be given among the game media which are set by the game medium setter in a range not exceeding the predetermined upper limit; a counter that counts a total number of game media given to the plurality of users or a remaining number of game media capable of being given to the plurality of users by the game medium giver; and a game medium number displayer that displays the total number or the remaining number to a user.

According to a non-limiting aspect, a game program, executed by a user terminal, in a game system which is realized by a plurality of user terminals operated by respective users and a server device capable of being connected to the plurality of user terminals through communication, the program causing a user terminal having a function of receiving information from a server device to function as: a game medium displayer that displays a game medium which is set to be in a state of being capable of being given to a plurality of users to a user; and a game medium number displayer that displays a total number of game media or a remaining number of game media to the user, the server device including a game medium setter that sets one or more kinds of game media to be in a state of being capable of being given to the plurality of users, an upper limit setter that sets a predetermined upper limit to a number of game media capable of being given to the plurality of users, a game medium giver that gives the user a game medium that the user desires to be given among the game media which are set by the game medium setter in a range not exceeding the predetermined upper limit, and a counter that counts a total number of game media given to the plurality of users or a remaining number of game media capable of being given to the plurality of users by the game medium giver, wherein the information from the server device to the user terminal relates to the game medium capable of being given to the plurality of users, and the total number or the remaining number.

Advantageous Effects of Invention

One or more of the above problems can be solved with each embodiment of the present invention.

DESCRIPTION OF EMBODIMENTS

Hereinafter, embodiments of the invention will be described with reference to the accompanying drawings. Hereinafter, description relating to effects shows an aspect of the effects of the embodiments of the invention, and does not limit the effects. Further, the order of respective processes that form a flowchart described below may be changed in a range without contradicting or creating discord with the processing contents thereof.

First Embodiment

First, the outline of a first embodiment of the invention will be described. Hereinafter, as the first embodiment, a description will be given by taking an example of a game program, executed by a server device, in a game system which is realized by a plurality of user terminals operated by respective users and the server device capable of being connected to the plurality of user terminals through communication.

Figure 1:
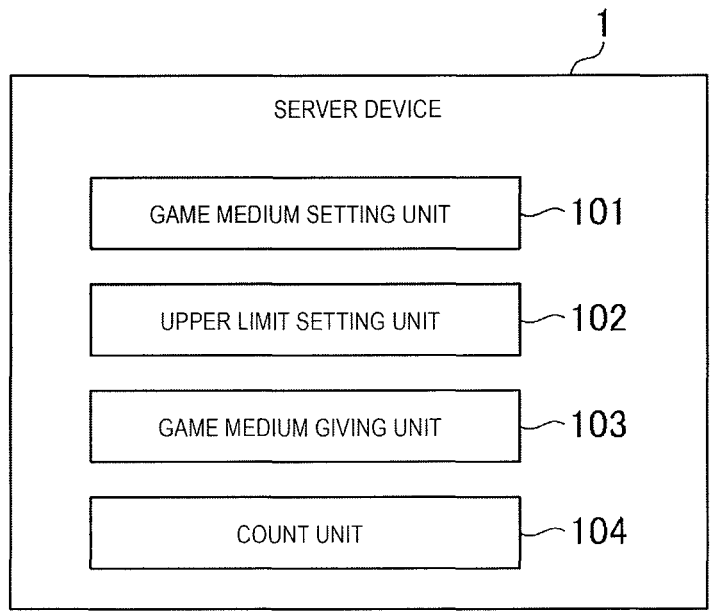
FIG. 1 is a block diagram illustrating a configuration of a server device which corresponds to at least one embodiment of the invention.

FIG. 1 is a block diagram illustrating a configuration of a server device which corresponds to at least one embodiment of the invention. A server device 1 includes at least a game medium setting unit 101, an upper limit setting unit 102, a game medium giving unit 103, and a count unit 104.

The game medium setting unit 101 has a function of setting one or more kinds of game media to be in a state of being capable of being given to a plurality of users. The upper limit setting unit 102 has a function of setting a predetermined upper limit to a number of game media capable of being given to a plurality of users.

The game medium giving unit 103 has a function of giving a user a game medium that the user desires to be given among the game media which are set by the game medium setting unit 101, in a range not exceeding the predetermined upper limit. The count unit 104 has a function of counting the total number of game media given to a plurality of users or the remaining number of game media capable of being given to the plurality of users by the game medium giving unit 103.

Figure 2:
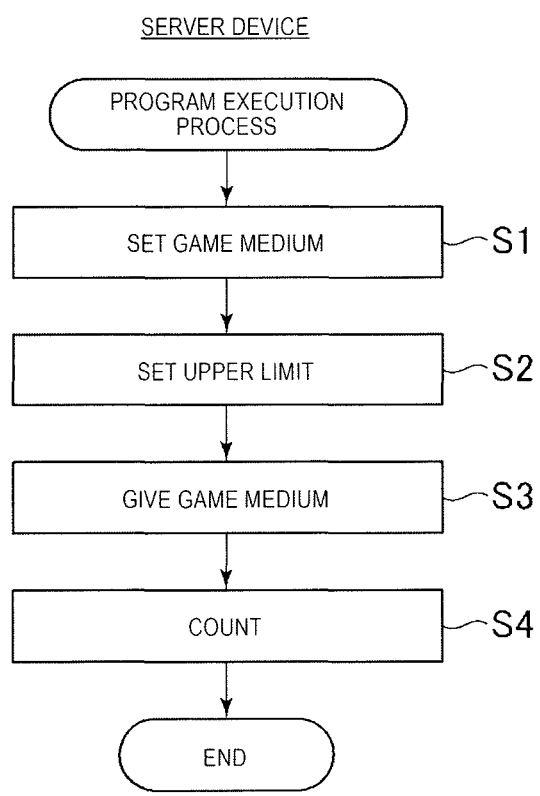
FIG. 2 is a flowchart of a program execution process which corresponds to at least one embodiment of the invention.

Next, a program (game program) execution process in the first embodiment of the invention will be described. FIG. 2 is a flowchart of a program execution process which corresponds to at least one embodiment of the invention.

The server device 1 sets one or more kinds of game media to be in a state of being capable of being given to a plurality of users (step S1), and sets a predetermined upper limit to a number of game media capable of being given to the plurality of users (step S2).

Next, a game medium that a user desires to be given among the game media which are set in step S1 is given to the user in a range not exceeding the predetermined upper limit which is set in step S2 (step S3). In a case where a game medium is given to a user in step S3, the total number of game media given to a plurality of users or the remaining number of game media capable of being given to the plurality of users is counted (step S4), and the process is terminated.

In an aspect of the first embodiment, it is possible to give a game medium to a user using a new method alternative to lottery drawing of the related art.

In the first embodiment, the term "user terminal" refers to a terminal such as, for example, a cellular phone, a smartphone, a tablet computer, a personal computer, a portable game console, or a stationary game console, which is capable of communicating with a server device and can execute a game. The term "user" refers to, for example, a player that operates a user terminal and plays a game. The term "server device" refers to, for example, a device that executes a process in accordance with a request from a user terminal. The term "game" refers to, for example, a computer game for starting up and executing a program in a server device and/or a user terminal, and the genre of game contents does not matter.

The term "game medium" refers to, for example, digital content used by a user in a game, and an example thereof includes a card, a character, a weapon, a protective guard, an item, an avatar, or the like. The term "type" of game medium refers to the type of name, degree of rare, level, image, or the like which is set in a game medium. For example, game media and the like which have the same name but have different degrees of rare, levels and the like are different from each other in type. The term "give" refers to, for example, associating a game medium with a user, and enabling the user to use the game medium in a game. Here, the wording "associating a game medium with a user" refers to, for example, updating user information managed by a server device so that information of the game medium is included in the user information, or the like. A case where a user can use a game medium for only a certain period of time such as that of loan is also included in the term "give". The wording "desire to be given" refers to, for example, performing a request for giving from a user terminal to a server device.

The term "predetermined upper limit" refers to the upper limit of the number of game media capable of being given to a plurality of users, and different upper limits can be set in accordance with, for example, a period, a group to which a user belongs, or the like. In addition, the term "predetermined upper limit" may be set, for example, for each type of game medium which is set to be in a state of being capable of being given, and may be set so as to be shared in all the game media which are set to be in a state of being capable of being given. The wording "total number of game media given to a plurality of users" refers to the total number of game media, given to a plurality of users in reality, which are set to be in a state of being capable of being given. For example, this may be the total number for each type of game medium which is set to be in a state of being capable of being given, in accordance with a method of setting a predetermined upper limit, and may be the total number of all the game media which are set to be in a state of being capable of being given.

Second Embodiment

Next, the outline of a second embodiment of the invention will be described. Hereinafter, as the second embodiment, a description will be given by taking an example of a game program, executed by a server device, in a game system which is realized by a plurality of user terminals operated by respective users and the server device capable of being connected to the plurality of user terminals through communication.

In a configuration of a server device in the second embodiment, the configuration shown in the block diagram of FIG. 1 can be adopted in a necessary range. In addition, in a flow of a program execution process in the second embodiment, the flow shown in the flowchart of FIG. 2 can be adopted in a necessary range.

In the second embodiment, the game medium setting unit 101 resets the type of game medium capable of being given to a user by the lapse of a predetermined period.

In an aspect of the second embodiment, it is possible to provide diversity to the type of game medium capable of being acquired by a user by resetting the type of game medium capable of being given to a user by the lapse of a predetermined period, and to suppress a decrease in the user's interest in a game by enhancing the user's level of satisfaction.

In the second embodiment, in the terms "user terminal", "user", "server device", "game", "game medium", "type" of game medium, "give", "desire to be given", "predetermined upper limit", and "total number of game media given to a plurality of users", respective contents described in the first embodiment can be adopted in a necessary range. The term "predetermined period" can be appropriately set with no particular restriction, for example, like 12 hours, 24 hours, a week, an event holding period during a game, or the like, and is not always the same period. The term "resetting" may have different setting contents and may have the same setting contents, for example, at every resetting.

Third Embodiment

Next, the outline of a third embodiment of the invention will be described. Hereinafter, as the third embodiment, a description will be given by taking an example of a game program, executed by a server device, in a game system which is realized by a plurality of user terminals operated by respective users and the server device capable of being connected to the plurality of user terminals through communication.

In a configuration of a server device in the third embodiment, the configuration shown in the block diagram of FIG. 1 can be adopted in a necessary range. In addition, in a flow of a program execution process in the third embodiment, the flow shown in the flowchart of FIG. 2 can be adopted in a necessary range.

In the third embodiment, the upper limit setting unit 102 resets the upper limit of the number of game media capable of being given to a plurality of users, by the lapse of a predetermined period.

In an aspect of the third embodiment, it is possible for even a user who has not been able to be given a game medium during a predetermined period to obtain an opportunity of being given a game medium again by resetting the upper limit of the number of game media capable of being given to a plurality of users by the lapse of a predetermined period, and possible to suppress a decrease in the user's interest in a game by enhancing the user's level of satisfaction.

In the third embodiment, in the terms "user terminal", "user", "server device", "game", "game medium", "type" of game medium, "give", "desire to be given", "predetermined upper limit", and "total number of game media given to a plurality of users", respective contents described in the first embodiment can be adopted in a necessary range. Further, in the third embodiment, in the terms "predetermined period", and "resetting", the contents described in the second embodiment can be adopted in a necessary range.

Fourth Embodiment

Next, the outline of a fourth embodiment of the invention will be described. Hereinafter, as the fourth embodiment, a description will be given by taking an example of a game program, executed by a server device, in a game system which is realized by a plurality of user terminals operated by respective users and the server device capable of being connected to the plurality of user terminals through communication.

Figure 3:
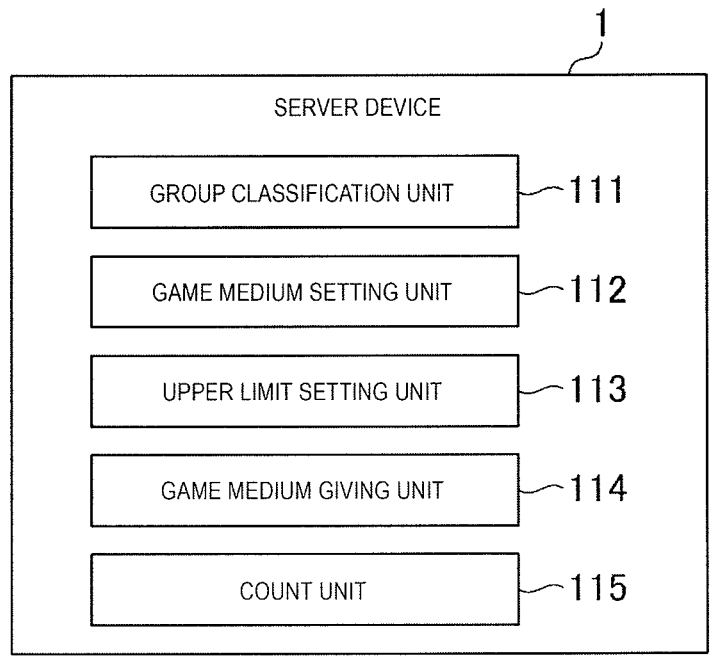
FIG. 3 is a block diagram illustrating a configuration of a server device which corresponds to at least one embodiment of the invention.

FIG. 3 is a block diagram illustrating a configuration of a server device which corresponds to at least one embodiment of the invention. The server device 1 includes at least a group classification unit 111, a game medium setting unit 112, an upper limit setting unit 113, a game medium giving unit 114, and a count unit 115.

The group classification unit 111 has a function of classifying a plurality of users into a plurality of groups on the basis of the statuses and/or attributes of the users. The game medium setting unit 112 has a function of setting one or more kinds of different game media to be in a state of being capable of being given to a user for each of the groups classified by the group classification unit 111. The setting of one or more kinds of different game media to be in a state of being capable of being given to a user for each group also includes, for example, an aspect in which setting is performed in a state where a group A is capable of being given a game medium a, a group B is capable of being given a game medium b, and a group C is capable of being given the game medium b, and game media different from those of other groups may be set to be in a state of being capable of being given, in any of the respective groups. In addition, in each group, at least one or more types of game media which are set to be in a state of being capable of being given may be made different.

The upper limit setting unit 113 has a function of setting a predetermined upper limit, for each of the groups classified by the group classification unit 111 and for each of the game media set by game medium setting unit 112. As an aspect in which the predetermined upper limit is set, for example, in a case where game media d and e are set to be in a state of being capable of being given to a group D, and game media e, f, and g are set to be in a state of being capable of being given to a group E, upper limits are individually set with respect to the game medium d set in the group D, the game medium e set in the group D, the game medium e set in the group E, the game medium f set in the group E, and the game medium g set in the group E, respectively.

The game medium giving unit 114 has a function of giving a user a game medium that the user desires to be given among the game media which are set by the game medium setting unit 112, in a range not exceeding the predetermined upper limit which is set by the upper limit setting unit 113. The game medium giving unit 114 can give, for example, a game medium to a user, in a range of an upper limit for each type of game medium capable of being given which is set with respect to a group to which a user belongs.

In a case where the game medium giving unit 114 gives a game medium to a user, the count unit 115 has a function of counting the total number of game media given to a plurality of users or the remaining number of game media capable of being given to the plurality of users by the game medium giving unit 114. The count unit 115 can count, for example, the total number of given game media or the remaining number of game media capable of being given, for each type of game medium capable of being given which is set with respect to a group to which a user belongs.

Figure 4:
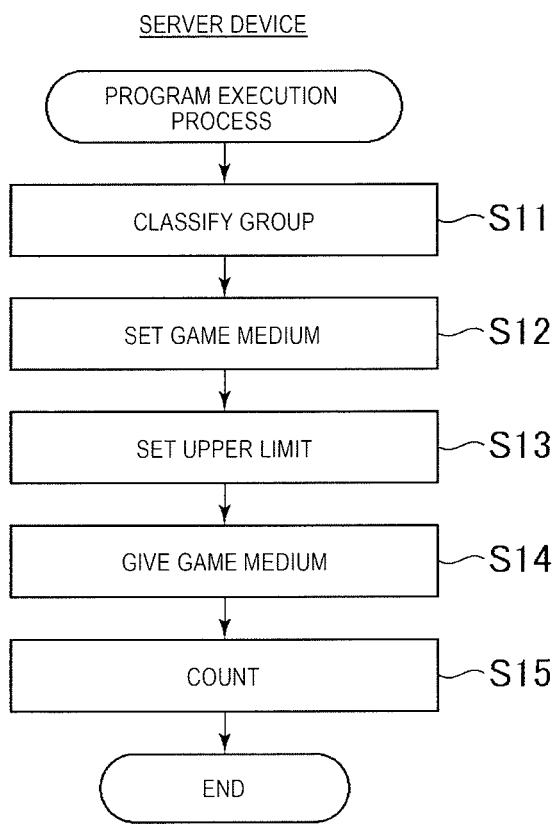
FIG. 4 is a flowchart of a program execution process which corresponds to at least one embodiment of the invention.

Next, a program execution process in a fourth embodiment of the invention will be described. FIG. 4 is a flowchart of a program execution process which corresponds to at least one embodiment of the invention.

The server device 1 classifies a plurality of users into a plurality of groups on the basis of the statuses and/or attributes of the users (step S11). Next, one or more kinds of different game media are set to be in a state of being capable of being given to a user for each of the groups classified in step S11 (step S12). Next, a predetermined upper limit is set for each of the groups classified in step S11 and for each of the game media set in step S12 (step S13).

Next, a game medium that a user desires to be given among the game media which are set in step S12 is given to the user in a range not exceeding the predetermined upper limit which is set in step S13 (step S14). In a case where a game medium is given to a user in step S14, the total number of game media given to a plurality of users or the remaining number of game media capable of being given to the plurality of users are counted (step S15), and the process is terminated.

In an aspect of the fourth embodiment, it is possible to give, for example, a game medium, consistent with the degree of a user's progress of a game, the user's taste, or the like, to the user by setting the type of game medium which is set to be in a state of being capable of being given to the user for each of the groups classified on the basis of the user's status and/or attribute, and to suppress a decrease in the user's interest in a game by enhancing the user's level of satisfaction. In addition, bargaining with other users becomes important by setting the upper limit of the number of game media capable of being given to a user for each group and game medium, and it is possible to enhance the strategy of a game.

In the fourth embodiment, in the terms "user terminal", "user", "server device", "game", "game medium", "type" of game medium, "give", "desire to be given", "predetermined upper limit", and "total number of game media given to a plurality of users", respective contents described in the first embodiment can be adopted in a necessary range.

The term "user's status" refers to, for example, a status fluctuating in relation to a user's game play such as the level, ranking, and number of game play days of the user, or the level of a player character or the like operated by the user. Here, the term "ranking" refers to, for example, a user's ranking determined on the basis of an evaluation value which is obtained by the progress of a game, event clear, or the like. For example, in a case where group classification is performed on the basis of ranking, it is possible to perform classification into groups such as a group within ranking 100, a group ranking 101 to 200, and a group from ranking 201 to 500. The numbers of users included in groups may be the same as each other, and may be different from each other. The term "user's attribute" refers to, for example, power, a country, a team, or the like to which a user belongs within a game, a team or a player cheered by the user, the sex or registration area of the user, a team to which a player character operated by the user belongs, and the like.

Fifth Embodiment

Next, the outline of a fifth embodiment of the invention will be described. Hereinafter, as the fifth embodiment, a description will be given by taking an example of a game program, executed by a user terminal, in a game system which is realized by a plurality of user terminals operated by respective users and a server device capable of being connected to the plurality of user terminals through communication.

Figure 5:
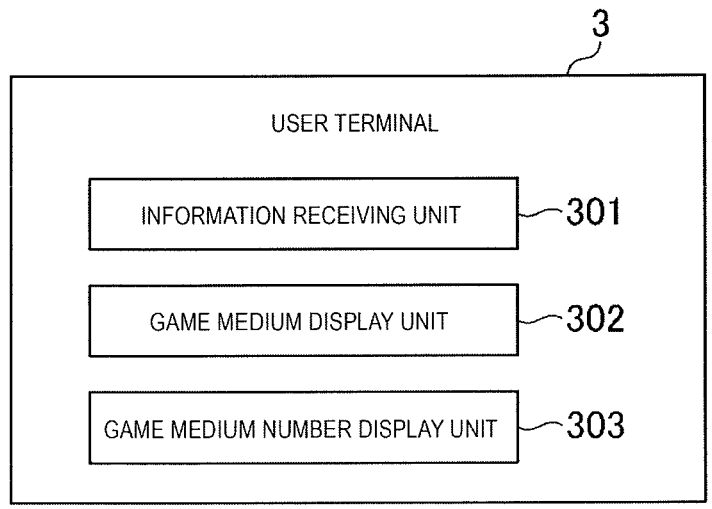
FIG. 5 is a block diagram illustrating a configuration of a user terminal which corresponds to at least one embodiment of the invention.

FIG. 5 is a block diagram illustrating a configuration of a user terminal which corresponds to at least one embodiment of the invention. A user terminal 3 includes at least an information receiving unit 301, a game medium display unit 302, and a game medium number display unit 303.

The information receiving unit 301 has a function of receiving information relating to a game medium capable of being given to a plurality of users which is set by a server device, and the total number of game media given to the plurality of users which are counted by the server device or the remaining number of game media capable of being given to the plurality of users, from the server device including an upper limit setter that sets a predetermined upper limit to a number of game media capable of being given to the plurality of users, a game medium giver that gives a user a game medium that the user desires to be given among game media which are set by a game medium setter in a range not exceeding the predetermined upper limit, and a counter that counts a total number of game media given to the plurality of users by the game medium giver or the remaining number of game media capable of being given to the plurality of users.

The game medium display unit 302 has a function of displaying a game medium which is set to be in a state of being capable of being given to a plurality of users, to the users, on the basis of the information received by the information receiving unit 301. The game medium number display unit 303 has a function of displaying the total number of game media given to a plurality of users or the remaining number of game media capable of being given to the plurality of users, to the user, on the basis of the information received by the information receiving unit 301.

Figure 6:
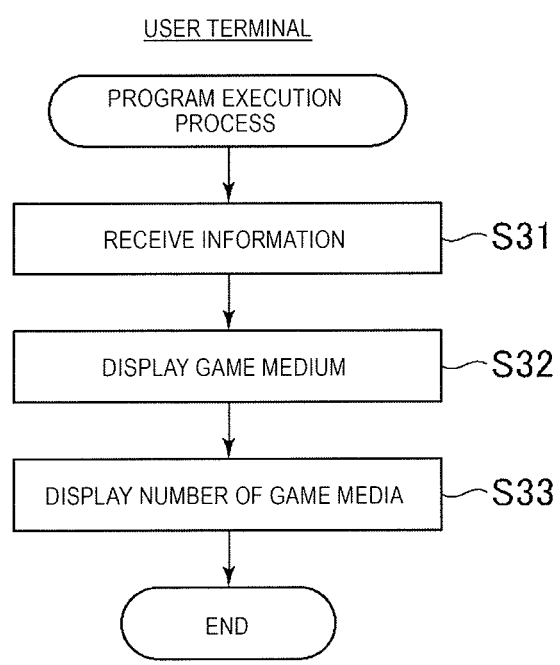
FIG. 6 is a flowchart of a program execution process which corresponds to at least one embodiment of the invention.

Next, a program execution process in a fifth embodiment of the invention will be described. FIG. 6 is a flowchart of a program execution process which corresponds to at least one embodiment of the invention.

The user terminal 3 receives the information relating to a game medium capable of being given to a plurality of users which is set by a server device, and the total number of game media given to the plurality of users which are counted by the server device or the remaining number of game media capable of being given to the plurality of users, from the server device (step S31).

Next, the game medium which is set to be in a state of being capable of being given to a plurality of users is displayed to the users on the basis of the information received in step S31 (step S32). In addition, the total number of game media given to a plurality of users or the remaining number of game media capable of being given to the plurality of users is displayed to the users on the basis of the information received in step S31 (step S33), and the process is terminated.

In an aspect of the fifth embodiment, it is possible to give a game medium to a user using a new method alternative to lottery drawing of the related art.

In the fifth embodiment, in the terms "user terminal", "user", "server device", "game", "game medium", "type" of game medium, "give", "desire to be given", "predetermined upper limit", and "total number of game media given to a plurality of users", respective contents described in the first embodiment can be adopted in a necessary range. The term "display" refers to, for example, displaying the name of a game medium which is set to be in a state of being capable of being given, parameters, an image or the like, and the total number of game media having already been given or the remaining number of game media, on a display screen.

Sixth Embodiment

Next, the outline of a sixth embodiment of the invention will be described. Hereinafter, as the sixth embodiment, a description will be given by taking an example of a game system which is realized in a plurality of user terminals operated by respective users and a server device capable of being connected to the plurality of user terminals through communication.

Figure 7:
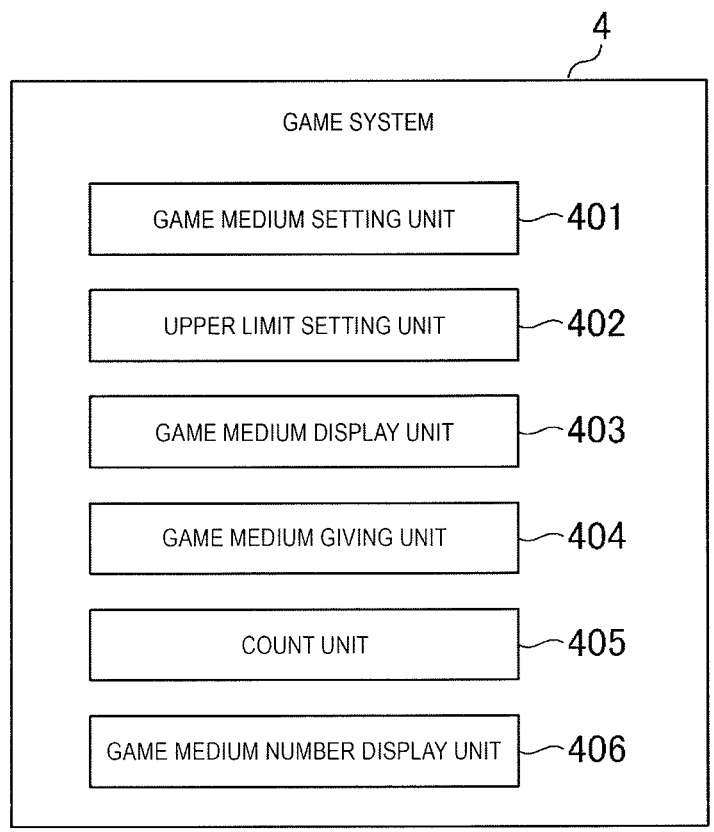
FIG. 7 is a block diagram illustrating a configuration of a game system which corresponds to at least one embodiment of the invention.

FIG. 7 is a block diagram illustrating a configuration of a game system which corresponds to at least one embodiment of the invention. A game system 4 includes at least a game medium setting unit 401, an upper limit setting unit 402, a game medium display unit 403, a game medium giving unit 404, a count unit 405, and a game medium number display unit 406.

The game medium setting unit 401 has a function of setting one or more kinds of game media to be in a state of being capable of being given to a plurality of users. The upper limit setting unit 402 has a function of setting a predetermined upper limit to a number of game media capable of being given to a plurality of users.

The game medium display unit 403 has a function of displaying the game media which are set to be in a state of being capable of being given to a plurality of users by the game medium setting unit 401, to the users. The game medium giving unit 404 has a function of giving a user a game medium that the user desires to be given among the game media which are set by the game medium setting unit 401, in a range not exceeding the predetermined upper limit.

The count unit 405 has a function of counting the total number of game media given to a plurality of users or the remaining number of game media capable of being given to the plurality of users by the game medium giving unit 404. The game medium number display unit 406 has a function of displaying the total number of game media given to the plurality of users or the remaining number of game media capable of being given to the plurality of users, to the users.

Figure 8:
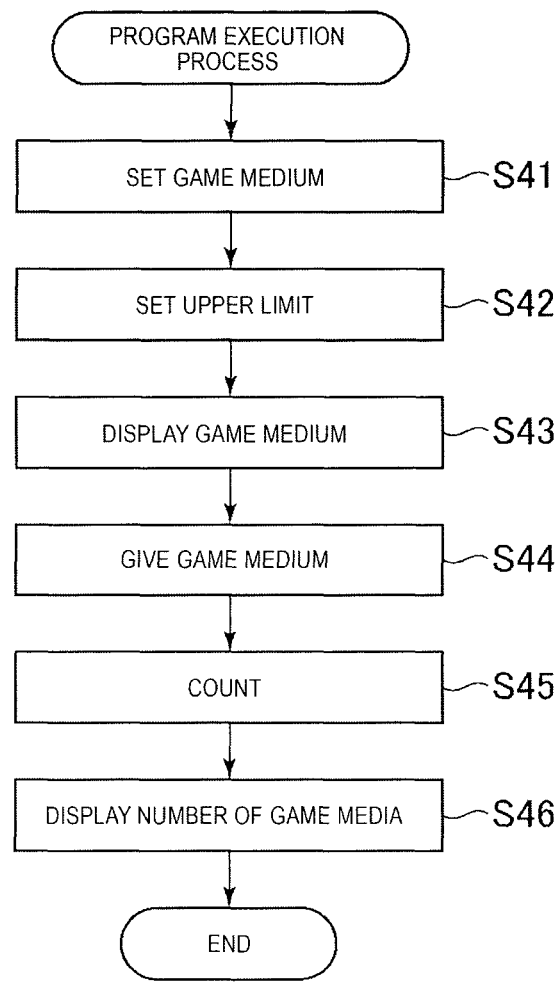
FIG. 8 is a flowchart of a program execution process which corresponds to at least one embodiment of the invention.

Next, a program execution process in the sixth embodiment of the invention will be described. FIG. 8 is a flowchart of a program execution process which corresponds to at least one embodiment of the invention.

The game system 4 sets one or more kinds of game media to be in a state of being capable of being given to a plurality of users (step S41), and sets a predetermined upper limit to a number of game media capable of being given to the plurality of users (step S42).

Next, the game media which are set to be in a state of being capable of being given to a plurality of users in step S41 are displayed to the users (step S43), and the game medium that a user desires to be given among the game media which are set in step S41 is given to the user in a range not exceeding the predetermined upper limit which is set in step S42 (step S44).

In a case where the game medium is given to the user in step S44, the total number of game media given to a plurality of users or the remaining number of game media capable of being given to the plurality of users is counted (step S45). In addition, the total number of game media given to a plurality of users or the remaining number of game media capable of being given to the plurality of users which is counted in step S45 is displayed to the users (step S46), and the process is terminated.

In an aspect of the sixth embodiment, it is possible to give a game medium to a user using a new method alternative to lottery drawing of the related art.

In the sixth embodiment, in the terms "user terminal", "user", "server device", "game", "game medium", "type" of game medium, "give", "desire to be given", "predetermined upper limit", and "total number of game media given to a plurality of users", respective contents described in the first embodiment can be adopted in a necessary range. In the sixth embodiment, in the term "display", the contents described in the fifth embodiment can be adopted in a necessary range.

Seventh Embodiment

Next, the outline of a seventh embodiment of the invention will be described. Hereinafter, as the seventh embodiment, a description will be given by taking an example of a game program, executed by a server device, in a game system which is realized by a plurality of user terminals operated by respective users and the server device capable of being connected to the plurality of user terminals through communication.

Figure 9:
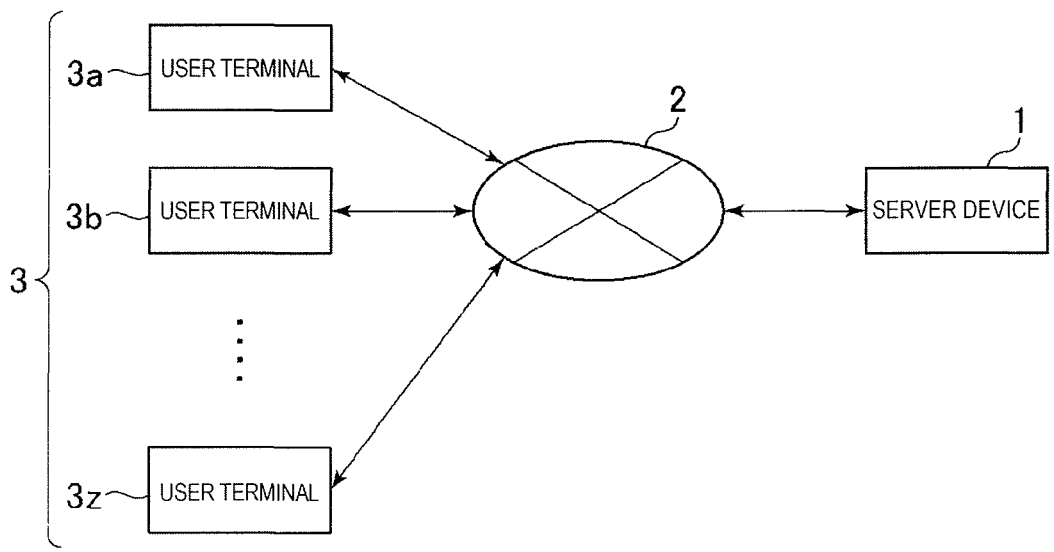
FIG. 9 is a block diagram illustrating a configuration of a game system which corresponds to at least one embodiment of the invention.

FIG. 9 is a block diagram illustrating a configuration of a game system which corresponds to at least one embodiment of the invention. As shown in the drawing, the game system is constituted by a server device 1, a communication network 2, and a plurality of user terminals 3 (3*a*, 3*b*, ..., 3*z*) operated by respective users. The server device 1 is connected to the user terminals 3 through the communication network 2. The server device 1 may not be connected to the user terminals 3 at all times, and may be able to be connected thereto as necessary.

Figure 10:
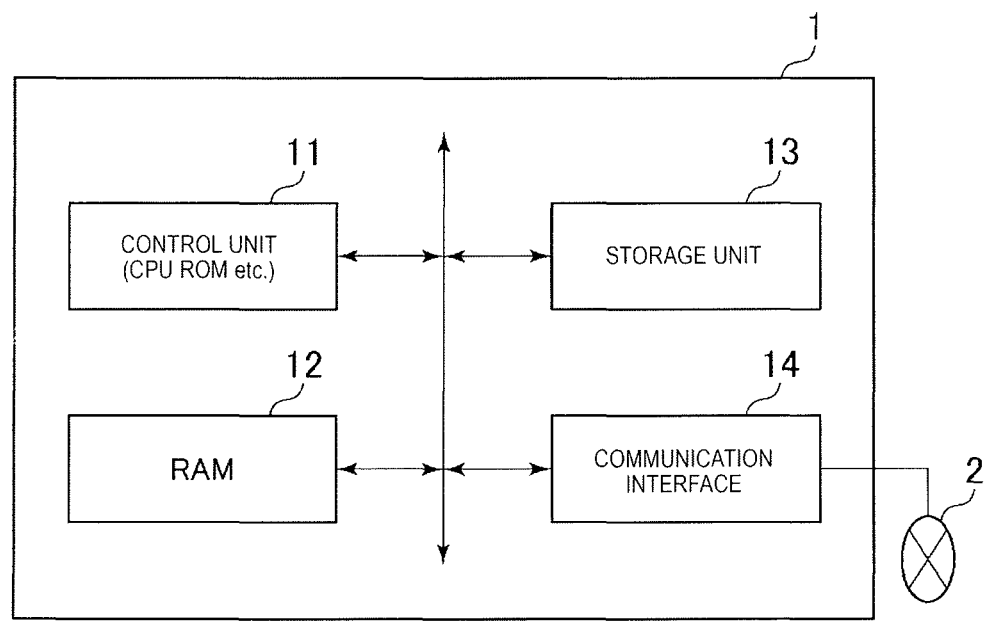
FIG. 10 is a block diagram illustrating a configuration of a server device which corresponds to at least one embodiment of the invention.

FIG. 10 is a block diagram illustrating a configuration of a server device which corresponds to at least one embodiment of the invention. The server device 1 includes at least a control unit 11, a Random Access Memory (RAM) 12, a storage unit 13, and a communication interface 14 which are connected to each other by an internal bus.

The control unit 11 is constituted by a Central Processing Unit (CPU) and a Read Only Memory (ROM), executes a program stored in the storage unit 13, and controls the server device 1. In addition, the control unit 11 includes an internal timer that clocks a time. The RAM 12 is a work area of the control unit 11. The storage unit 13 is a storage area for storing a program (including a game program) and data (including game data). The control unit 11 reads out the program and data from the RAM 12, and performs a program execution process on the basis of information or the like received from the user terminals 3.

Figure 11:
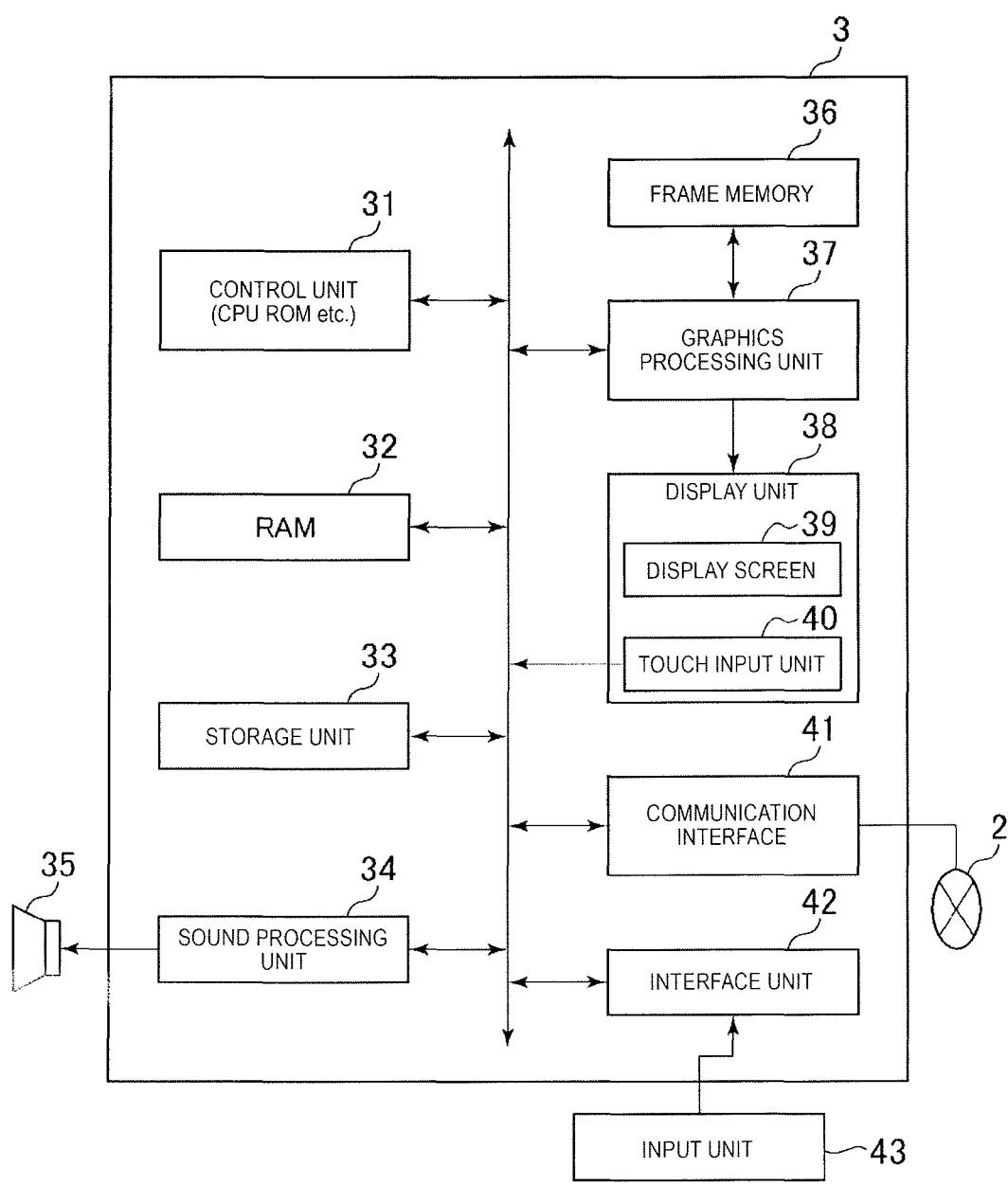
FIG. 11 is a block diagram illustrating a configuration of a user terminal which corresponds to at least one embodiment of the invention.

FIG. 11 is a block diagram illustrating a configuration of a user terminal which corresponds to at least one embodiment of the invention. The user terminal 3 includes at least a control unit 31, a RAM 32, a storage unit 33, a sound processing unit 34, a graphics processing unit 37, a communication interface 41, and an interface unit 42 which are connected to each other by an internal bus.

The control unit 31 is constituted by a CPU and a ROM. The control unit 31 executes a program stored in the storage unit 33, and controls the user terminal 3. The RAM 32 is a work area of the control unit 31. The storage unit 33 is a storage area for storing a program and data.

The control unit 31 reads out the program and data from the RAM 32 and processes the program and data. The control unit 31 processes the program and data loaded into the RAM 32, to output a sound output instruction to the sound processing unit 34 and output a drawing command to the graphics processing unit 37.

The sound processing unit 34 is connected to a sound output device 35 which is a speaker. In a case where the control unit 31 outputs the sound output instruction to the sound processing unit 34, the sound processing unit 34 outputs a sound signal to the sound output device 35.

The graphics processing unit 37 is connected to a display unit 38. The display unit 38 includes a display screen 39. In a case where the control unit 31 outputs the drawing command to the graphics processing unit 37, the graphics processing unit 37 develops an image in a frame memory (frame buffer) 36, and outputs a video signal for displaying an image on the display screen 39. Here, the display unit 38 may be a screen of a touch panel including a touch input unit 40.

The graphics processing unit 37 executes drawing of one image in the unit of frames. One frame time for an image is, for example, 1/30 seconds. The graphics processing unit 37 takes charge of a portion of arithmetic processing relating to drawing performed by only the control unit 31, and has a role of dispersing the load of the entire system.

An input unit 43 (such as, for example, a mouse or a keyboard) can be connected to the interface unit 42. Information of a user's input from the input unit 43 is stored in the RAM 32, and the control unit 31 executes various types of arithmetic processing on the basis of the input information. Alternatively, a recording medium reading device is connected to the interface unit 42, and thus a program, data and the like can also be read from an external memory and the like. In addition, the display unit 38 including a touch panel can also be used as the input unit 43.

The communication interface 41 can be connected to the communication network 2 in a wireless or wired manner, and can receive data through the communication network 2. The data received through the communication interface 41 is loaded into the RAM 32 similarly to data read from an external memory, and is arithmetically processed by the control unit 31.

Figure 12:
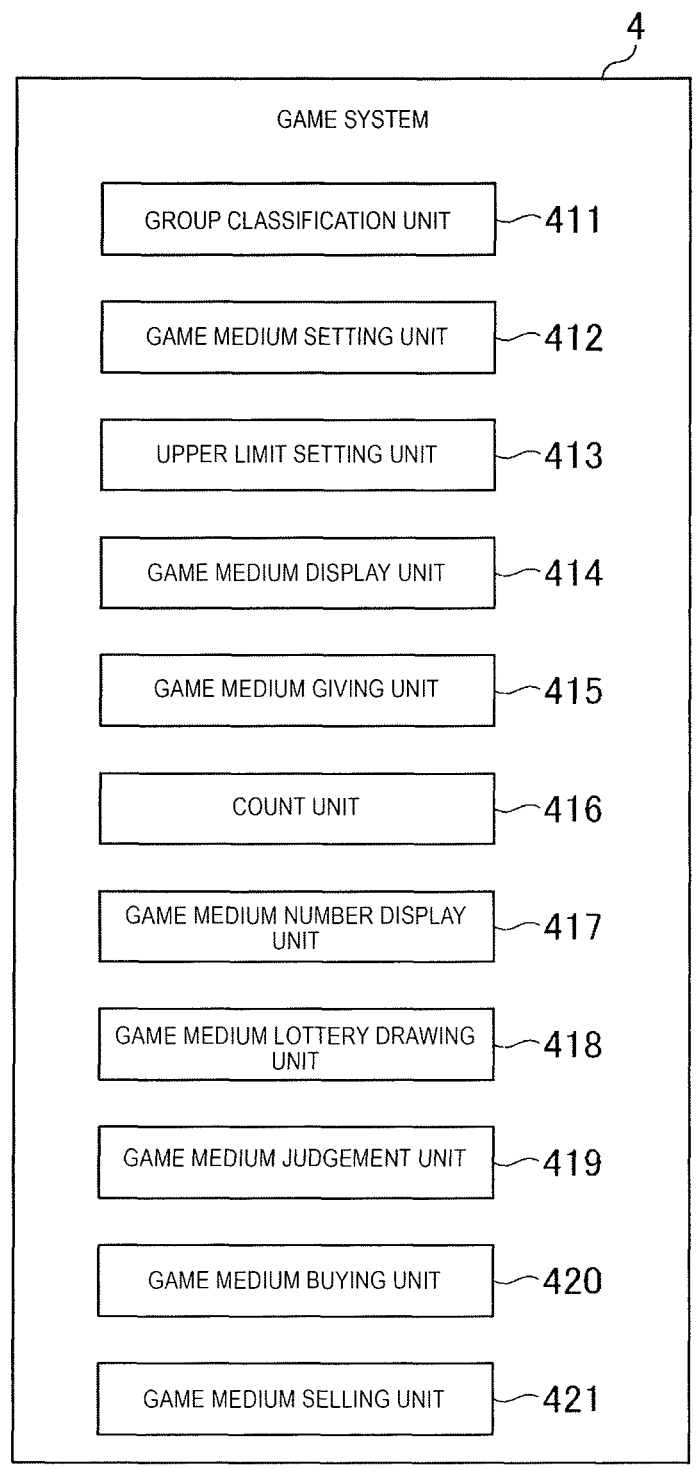
FIG. 12 is a block diagram illustrating a configuration of a game system which corresponds to at least one embodiment of the invention.

FIG. 12 is a block diagram illustrating a configuration of a game system which corresponds to at least one embodiment of the invention. A game system 4 includes at least a group classification unit 411, a game medium setting unit 412, an upper limit setting unit 413, a game medium display unit 414, a game medium giving unit 415, a count unit 416, a game medium number display unit 417, a game medium lottery drawing unit 418, a game medium judgement unit 419, a game medium buying unit 420, and a game medium selling unit 421.

The group classification unit 411 has a function of classifying a plurality of users into a plurality of groups on the basis of the statuses and/or attributes of the users. It is preferable that the group classification unit 411 classifies a plurality of users into a plurality of groups on the basis of ranking given to the users in accordance with the users' play results. The groups are classified the on the basis of the ranking, and thus users having similar abilities can be set to the same group within a game. As a result, a game medium which is set to be in a state of being capable of being given by the game medium setting unit 412 described later and a user's needs are easily matched with each other. In addition, it is possible to further enhance the strategy of a game by enhancing the importance of bargaining between users.

In addition, in a case where the group classification unit 411 classifies a plurality of users into a plurality of groups on the basis of the users' ranking, it is preferable to perform group classification again whenever a predetermined ranking collection period is terminated. With such a configuration, it is possible to give a user a motive of attempting to acquire higher ranking, and to improve the taste of a game.

In addition, the group classification unit 411 may classify a plurality of users into a plurality of groups, using a plurality of group classification criteria such as, for example, the users' ranking and team to which the users belong. In addition, the group classification unit 411 may classify a plurality of users into a plurality of groups so that each of the plurality of users belongs to two or more groups, and can also classify, for example, a user A so as to belong to both groups of a group Gr1 classified on the basis of the ranking of the user A and a group Gt1 classified on the basis of a team to which the user A belongs. With such a configuration, a game medium which is set to be in a state of being capable of being given by the game medium setting unit 412 described later and a user's needs are more easily matched with each other. In addition, it is possible to further enhance the strategy of a game by enhancing the importance of bargaining between users.

The game medium setting unit 412 has a function of setting one or more kinds of different game media to be in a state of being capable of being given to a user, for each of the groups classified by the group classification unit 411. It is possible to give, for example, a game medium, consistent with the degree of a user's progress of a game, the user's taste, or the like, to the user by setting the type of game medium which is set to be in a state of being capable of being given to the user for each of the groups classified on the basis of the user's status and/or attribute, and to suppress a decrease in the user's interest in a game by enhancing the user's level of satisfaction.

The setting of one or more kinds of different game media to be in a state of being capable of being given to a user for each group also includes, for example, an aspect in which setting is performed in a state where a group A is capable of being given a game medium a, a group B is capable of being given a game medium b, and a group C is capable of being given the game medium b, and game media different from those of other groups may be set to be in a state of being capable of being given, in any of the respective groups. In addition, in each group, at least one or more types of game media which are set to be in a state of being capable of being given may be made different.

It is preferable that the game medium setting unit 412 has a function of setting one or more kinds of game media to be in a state of being capable of being given to a plurality of users, and then resetting the type of game medium capable of being given to the users by the lapse of a predetermined period. With such a configuration, it is possible to give a game medium consistent with each user's needs at that time to the user, and to suppress a decrease in the user's interest in a game by enhancing the user's level of satisfaction. In addition, for example, in a case where the group classification is performed on the basis of the users' ranking, it is preferable to reset the type of game medium capable of being given to the users in a case where a predetermined ranking collection period is terminated.

In addition, it is preferable that, for example, in a case where the groups are classified by a criterion capable of determining predominance between the groups such as the users' ranking, the users' levels or the like, the game medium setting unit 412 sets a game medium more advantageous to a game play to be in a state of being capable of being given to a more superior group. With such a configuration, it is possible to give a user a motive of attempting to acquire a higher ranking or level, and to improve the taste of a game by enhancing the user's level of satisfaction.

The upper limit setting unit 413 has a function of setting a predetermined upper limit for each of the groups classified by the group classification unit 411 and for each of the game media set by the game medium setting unit 412. By setting the upper limit of the number of game media capable of being given to a user for each of the groups and game media, bargaining with other users becomes more important, and it is possible to enhance the strategy of a game.

It is preferable that the upper limit setting unit 413 has a function of setting a predetermined upper limit to a number of game media capable of being given to a plurality of users, and then resetting the upper limit of the number of game media capable of being given to the plurality of users by the lapse of a predetermined period. With such a configuration, it is possible for even a user who has not been able to be given a game medium during the predetermined period to obtain an opportunity of being given a game medium again, and possible to suppress a decrease in the user's interest in a game by enhancing the user's level of satisfaction. In addition, for example, in a case where the group classification is performed on the basis of the users' ranking, it is preferable to reset the upper limit of the number of game media capable of being given to the users in a case where the aforementioned term "predetermined ranking collection period" is terminated.

The game medium display unit 414 has a function of displaying the game media which are set to be in a state of being capable of being given to a plurality of users by the game medium setting unit 412, to the users. When a game medium is displayed, it is preferable to display the upper limit which is set by the upper limit setting unit 413 to a user, together.

The game medium giving unit 415 has a function of giving a user a game medium that the user desires to be given among the game media which are set by the game medium setting unit 412, in a range not exceeding the predetermined upper limit which is set by the upper limit setting unit 413.

In a case where a game medium is given to a user, it is preferable to request a user to pay some kind of price such as the consumption of items or points (hereinafter, also referred to as "charging or the like") within a game which are given to the user in exchange for giving a game medium, for example, in a case of charging or acceptance of charging. By requesting a user to pay a price for giving a game medium, a determination of whether the game medium is given becomes important, and it is possible to further enhance the strategy of a game. Without requesting a price for giving a game medium, for example, in a case where the game medium is given to a user, an effect disadvantageous to the progress of a game may be generated to the user. An example of an effect disadvantageous to the progress of a game includes an increase in the consumption of stamina or the like required for progressing a game, a decrease in the amount of acquisition of an experience point or the like required for raising a user's level, or the like.

In a case where the game medium giving unit 415 gives a game medium to a user, the count unit 416 has a function of counting the total number of game media given to a plurality of users or the remaining number of game media capable of being given to the plurality of users by the game medium giving unit 415. A number obtained by subtracting the total number of game media given to a plurality of users by the game medium giving unit 415 from the upper limit which is set by the upper limit setting unit 413 becomes the remaining number of game media capable of being given to the users, and becomes the upper limit of the number of game media capable of being given to the users at that point in time.

The game medium number display unit 417 has a function of displaying the total number of game media given to a plurality of users or the remaining number of game media capable of being given to the plurality of users, counted by the count unit 416, to the users. It is preferable that the game medium number display unit 417 displays the number of upper limits which are set by the upper limit setting unit 413, to the users, together with the total number or the remaining number. With such a configuration, the user ascertains the number of game media having already given to other users, and thus it is possible to make a basic determination of whether a game medium is given, and to further enhance the strategy of a game. The display of the total number or the remaining number may not have specific numerals displayed, and may be performed by displaying a selling situation like, for example, "for sale", "slightly remaining", or "sellout".

The game medium lottery drawing unit 418 has a function of performing lottery drawing in exchange for virtual currency owned by a user, and giving a game medium to the user on the basis of the lottery drawing result. For example, the game medium lottery drawing unit 418 performs lottery drawing on the basis of the winning probability of each game medium which is set in advance, in exchange for virtual currency of a predetermined amount, and gives a winning game medium to the user.

In the present embodiment, methods of giving a game medium to a user includes two methods of a method of giving a user's desired game medium through the above-described game medium giving unit 415 and a method of giving a game medium to a user on the basis of the lottery drawing result through the game medium lottery drawing unit 418. A plurality of methods of giving a game medium to a user are included, and thus it is possible to improve the taste of a game.

In addition, it is preferable that the game medium given by the game medium giving unit 415 and the game medium given by the game medium lottery drawing unit 418 are different from each other in type. For example, it is preferable that the game medium given by the game medium giving unit 415 is a game medium which is more advantageous to a game play than the game medium given by the game medium lottery drawing unit 418. With such a configuration, both an improvement in the taste of a game by including a plurality of methods of giving a game medium to a user and an improvement in the strategy of a game by obtaining the determination of whether a game medium is given can be achieved in a high balance.

The game medium judgement unit 419 has a function of judging a game medium (for example, game medium given to a user by the game medium giving unit 415) given to a user in exchange for charging or the like and a game medium (for example, game medium given to a user by the game medium lottery drawing unit 418) given to a user in exchange for virtual currency. The judgement of a game medium is performed by, for example, by storing whether being a game medium given by charging or the like and/or whether being a game medium given in exchange for virtual currency when the game medium is given to a user, in a server device in association with the game medium, and acquiring stored information thereof. It is preferable to perform a display in an aspect in which a user can recognize whether being a game medium given by charging or the like or a game medium given in exchange for virtual currency when the game medium is displayed to a display unit of a user terminal.

The game medium buying unit 420 has a function of exchanging a game medium owned by a user for virtual currency capable of being used within a game, in accordance with a selling request from the user. The game medium selling unit 421 has a function of giving a game medium sold by a user to other users, in exchange for charging or the like, in accordance with a request from other users. By including the game medium buying unit 420 and the game medium selling unit 421, it is possible to exchange a game medium having a low utility value for a user for virtual currency, and to obtain a game medium having a high utility value for a user in exchange for charging or the like. As a result, it is possible to suppress a decrease in the user's interest in a game by enhancing a user's level of satisfaction. The game medium selling unit 421 may give a game medium in exchange for virtual currency. In addition, the unit may have a function of causing a user to select whether to obtain a game medium in exchange for charging or the like, or to obtain a game medium in exchange for virtual currency.

It is preferable that the amount of charging or the amount of virtual currency required when a game medium is given by the game medium selling unit 421 is controlled by a game system on the basis of parameters of the game medium, the degree of rare, or the like. As described above, the sale of an unnecessary card and the purchase of a sold card are performed through the game system without being directly performed between users, and thus it is possible to prevent real money trade from being performed between users.

In addition, it is preferable that a game medium which can be exchanged for virtual currency by the game medium buying unit 420 is set to only a game medium given to a user in exchange for virtual currency. A game medium given by charging or the like is not able to be caused to be exchanged for virtual currency, and is not caused to be given to other users by the game medium selling unit 421. Thereby, the two game medium giving methods are further differentiated from each other, and thus it is possible to enhance the taste of a game.

Figure 13:
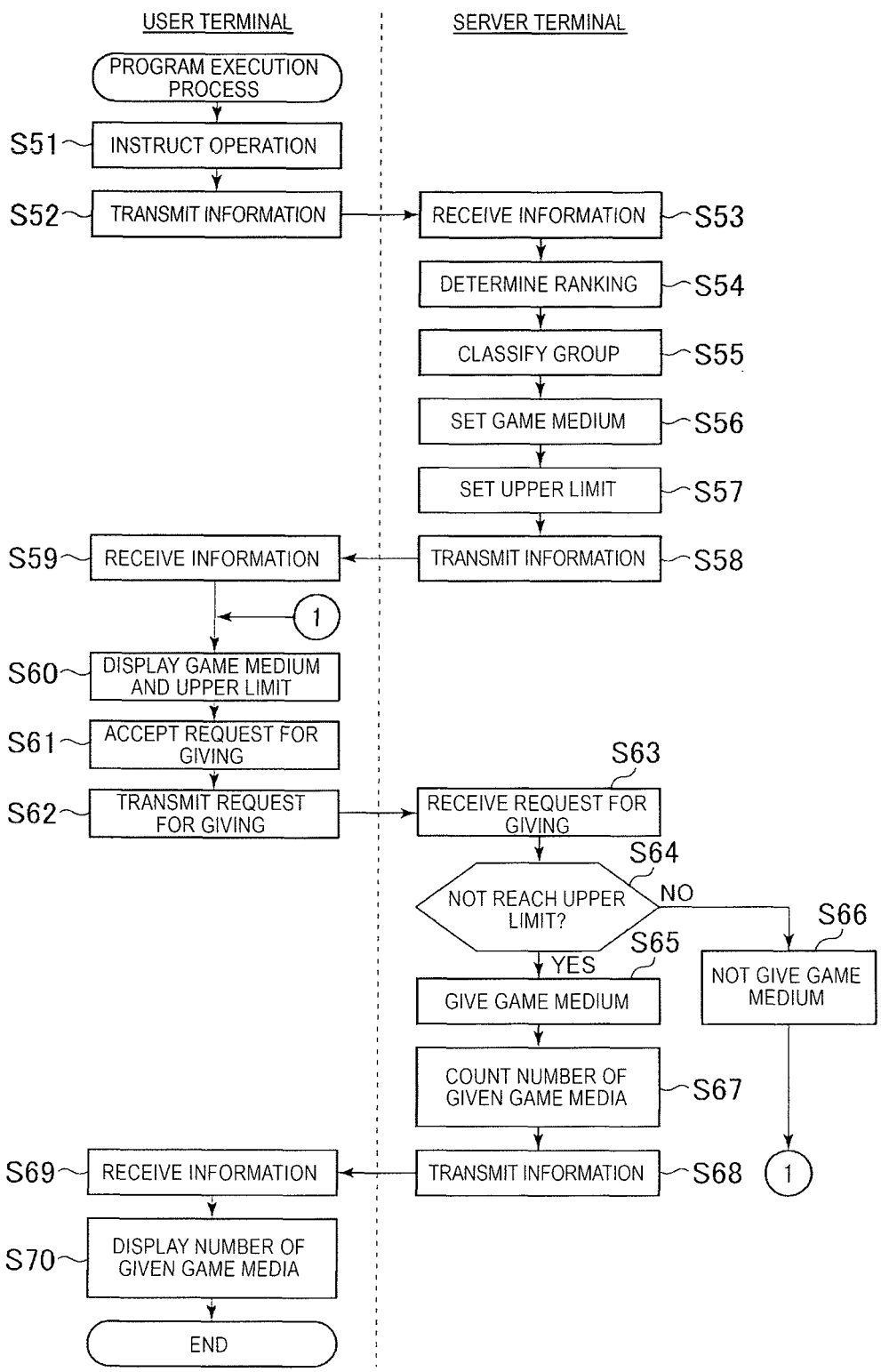
FIG. 13 is a flowchart of a program execution process which corresponds to at least one embodiment of the invention.

Next, a program execution process in the seventh embodiment of the invention will be described. FIG. 13 is a flowchart of a program execution process which corresponds to at least one embodiment of the invention.

In the following description, an example of a game includes a game in which a game is progressed using a virtual card owned by (available to a user) a user, and competition with others in ranking is performed by an evaluation value obtained in the progress of a game. Information of a virtual card owned by a user is managed by a server device or a user terminal, for example, as user information, and the user information is updated when a process of giving game medium to a user is performed, or the like.

First, a game is progressed by a user terminal on the basis of a user's operation instruction (step S51). A game is performed using a virtual card having parameters, a skill and the like used in the game attached thereto. For example, in a case of a role-playing game, the virtual card has parameters such as offensive power, defensive power or a maximum hit point, a skill invoking a predetermined effect, or the like attached thereto. A user selects any virtual card, aims at achieving a predetermined object such as, for example, defeating a boss, winning a victory over other users, reaching a destination, or clearing an event, and competes with others in ranking on the basis of an evaluation value obtained in a case where the predetermined object is achieved.

In addition, in a case of a game in which results or active players are predicted regarding sports events performed in reality, for example, active players and the contents of activity are predicted by setting a virtual card indicating the contents of activity (such as, for example, hitting a home run, scoring a goal, or selection as an MVP) to a virtual card indicating a player, or the like. A standard evaluation value obtained in a case where the prediction comes true is set in the virtual card indicating the contents of activity. A number capable of setting the virtual card indicating the contents of activity, or a coefficient multiplied by a standard evaluation value is set in the virtual card indicating a player. In a case where the prediction comes true, a user acquires a value obtained by multiplying the standard evaluation value by the coefficient as an evaluation value, and competes with others in ranking on the basis of the acquired evaluation value.

The genre of a game is not limited to the game as described above, and can be applied to, for example, a simulation game, an action game, or the like regardless of its genre.

In a case where a game progresses based on step S51, information relating to the progress of a game is transmitted from the user terminal to the server device at a predetermined timing (step S52). The progress of a game may be performed in the user terminal, and may be performed in the server device having received operation information from the user terminal. The server device receives the information relating to the progress of a game from the user terminal (step S53), gives a user a predetermined evaluation value according to the user's progress of a game or the status of the achievement of a predetermined object, and determines the user's ranking on the basis of the total of evaluation values in a predetermined ranking collection period (step S54). From the viewpoint of enhancing the strategy and taste of a game, it is preferable to display tentative ranking to the user even during the ranking collection period.

Next, a plurality of users are classified into a plurality of groups on the basis of the determined ranking (step S55). In the group classification, a plurality of users may be further classified into a plurality of groups using a group classification criterion different from ranking.

For example, in a case where a user selects predetermined power, and progresses a game using a virtual card relevant to the selected power, a plurality of users are first classified into groups by the selected power, and then classification based on ranking may be further performed within each power group. In addition, the group classification may be performed by a group classification criterion different from ranking, in addition to the group classification based on ranking. In this case, for example, a user A is classified into two groups of a group Gr1 classified on the basis of ranking and a group Gt1 classified on the basis of the user's selected power.

Next, a different virtual card is set to be in a state of being capable of being given to a user for each group classified in step S55 (step S56). The selection of the virtual card which is set to be in a state of being capable of being given can be appropriately performed in accordance with, for example, the rank of a group based on the ranking of users included in a group, the number of circulations of various types of virtual cards within a game, the contents of an event which is being held or is scheduled to be held, or the like. In addition, selection probability may be set in advance for each virtual card, and the selection may be performed on the basis of the selection probability.

It is preferable that a virtual card more advantageous to a game play such as a virtual card having a high parameter, a virtual card having a high degree of rare, or a virtual card having a high effect when used is set in a group in which a user having a high ranking is included to be in a state of being capable of being given, rather than in a group in which a user having a low ranking is included. With such a configuration, it is possible to give a user a motive of attempting to acquire higher ranking, and to improve the taste of a game. In addition, since an opportunity of obtaining an advantageous virtual card is provided to a user having acquired a high ranking, the user's level of satisfaction can also be set to be high.

Next, the upper limit of the number of virtual cards capable of being given, applied to a plurality of users included in a group, is set for each virtual card which is set to be in a state of being capable of being given (step S57). The setting of the upper limit may be performed in accordance with the total number of users included in a group, the total number of virtual cards circulated within a game, the degree of rare or parameters of a virtual card, or the like. For example, a value obtained by multiplying the total number of users included in a group by a predetermined multiplying factor (for example, 0.1) can be set to the upper limit, or the upper limit can be set to become lower as the degree of rare of a virtual card becomes higher. The setting of the upper limit is not performed for each virtual card, and may be performed on all the virtual cards which are set to be in a state of being capable of being given.

Figure 14:
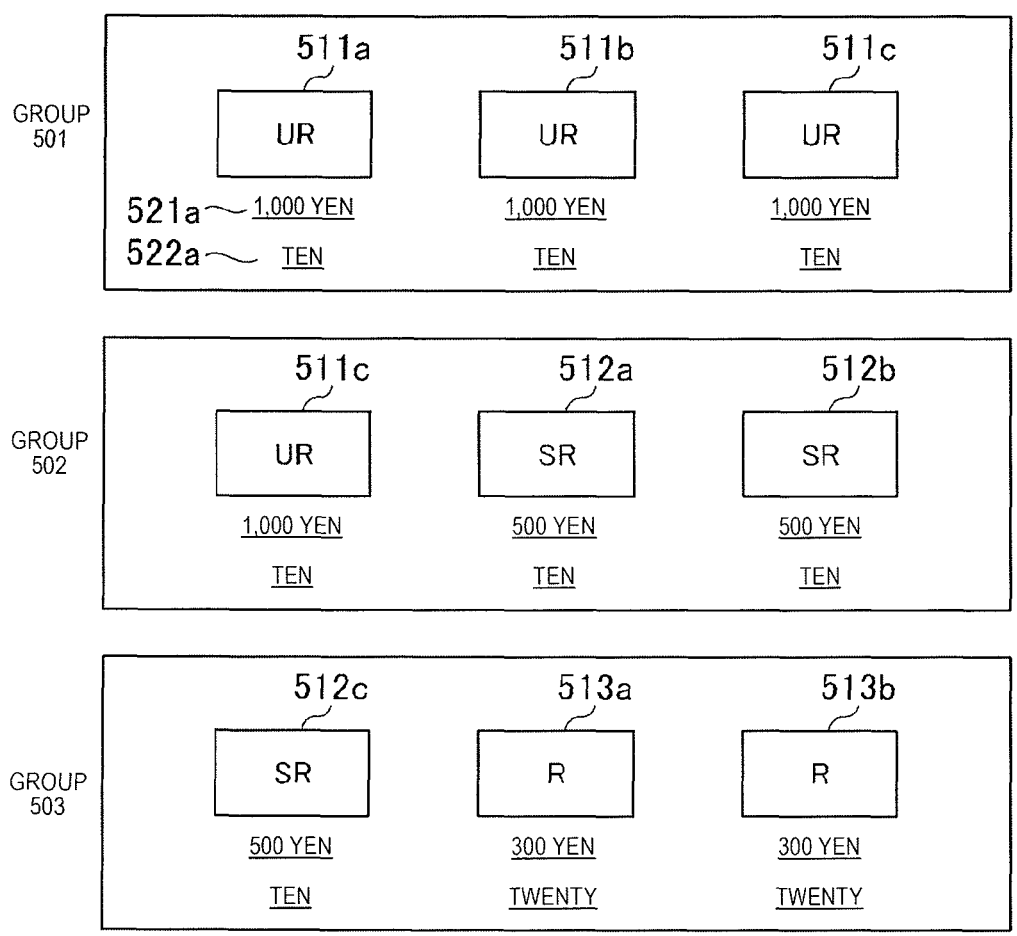
FIG. 14 is a diagram illustrating an example of group classification, setting a game medium capable of being given, and setting the upper limit of the number of game media capable of being given, which corresponds to at least one embodiment of the invention.

FIG. 14 is a diagram illustrating an example of group classification, setting a game medium capable of being given, and setting the upper limit of the number of game media capable of being given, which corresponds to at least one embodiment of the invention. In FIG. 14, users are classified into any of a group 501 in which users of ranking 1 to 100 are included, a group 502 in which users of ranking 101 to 1000 are included, and a group 503 in which users of ranking 1001 or lower are included, on the basis of ranking based on the total of evaluation values for a week.

Virtual cards 511a to 511c having the degree of rare of "ultra rare (UR)" are set in the group 501 to be in a state of being capable of being given to users. Here, the virtual cards 511a to 511c have the same degree of rare, but are different types of virtual cards. The virtual cards 511a to 511c are, for example, a card having a small number of circulations within a game, a card having parameters, skills or the like capable of advantageously advancing an event which is being held or is scheduled to be held, or a card selected by selection probability which is set in advance for each virtual card, or the like, among the virtual cards having the degree of rare of "UR". Each of the virtual cards 511a to 511c may be selected by the same selection criterion, and may be selected by different selection criteria.

The virtual card 511c having the degree of rare of "ultra rare (UR)" and virtual cards 512a and 512b having the degree of rare of "super rare (SR)" are set in the group 502 to be in a state of being capable of being given to users. A virtual card 512c having the degree of rare of "super rare (SR)" and virtual cards 513a and 513b having the degree of rare of "rare (R)" are set in the group 503 to be in a state of being capable of being given to users. In the example of FIG. 14, the selection of virtual cards which are set to be in a state of being capable of being given is performed so that more virtual cards having a high degree of rare are selected as the rank of a group becomes higher. In the present embodiment, the degree of rare becomes higher in order of "UR", "SR", and "R".

In a case where a user requests to be given each virtual card, prices to be paid by the user are described in a necessary price field 521. For example, "1,000 yen" is described in the necessary price field 521a, which means that it is necessary to pay 1,000 yen in order for a user to be given the virtual card 511a. For example, in a case of a game in which items or points are given by charging, and the items and the like are used in payment, the number of necessary items and the like are described. The upper limit of the number of virtual cards capable of being given to a user is described in an upper limit field 522. For example, "10" is described in an upper limit field 522a of the virtual card 511a, which means that all the users included in the group 501 are not given virtual cards exceeding the number of 10.

In FIG. 14, the virtual card 511c is set in both the group 501 and the group 502 to be in a state of being capable of being given. In this manner, in a case where the same virtual card is set in different groups so as to be given, a necessary price, an upper limit number, or the like may be provided with a difference so that a group in which users having a high ranking are included becomes more superior. With such a configuration, it is possible to give a motive of attempting to acquire a higher ranking to a user, and to improve the taste of a game. In addition, since a user having acquired a high ranking can obtain a virtual card in advantageous conditions, it is possible to enhance the user's level of satisfaction.

In FIG. 14, group classification, the setting of virtual cards capable of being given, and the setting of the upper limit of the number of virtual cards capable of being given are performed every week which is a ranking collection period. With such a configuration, making a user's efforts toward the improvement of ranking for only a specific week allows the user to obtain an opportunity of obtaining a virtual card having a high degree of rare, and thus it is possible to eliminate the user's dissatisfaction due to a desired card not being obtained. In the example of FIG. 14, the ranking collection period is set to a week, but as the ranking collection period, for example, 12 hours, 24 hours, a week or the like can be set with no particular restriction.

In addition, it is preferable that the type of virtual card which is set in the groups 501 to 503 to be in a state of being capable of being given is displayed to a user, for example, before ranking is established during the ranking collection period or the like. A user is informed beforehand of virtual cards which are set in each group to be in a state of being capable of being given, and thus the user can make a determination of whether the user aims at a higher ranking. As a result, it is possible to prevent the occurrence of dissatisfaction that there is no desired virtual card among virtual cards which are set to be in a state of being capable of being given, for example, in spite of a high-order ranking being acquired using many consumption items.

Figure 15:
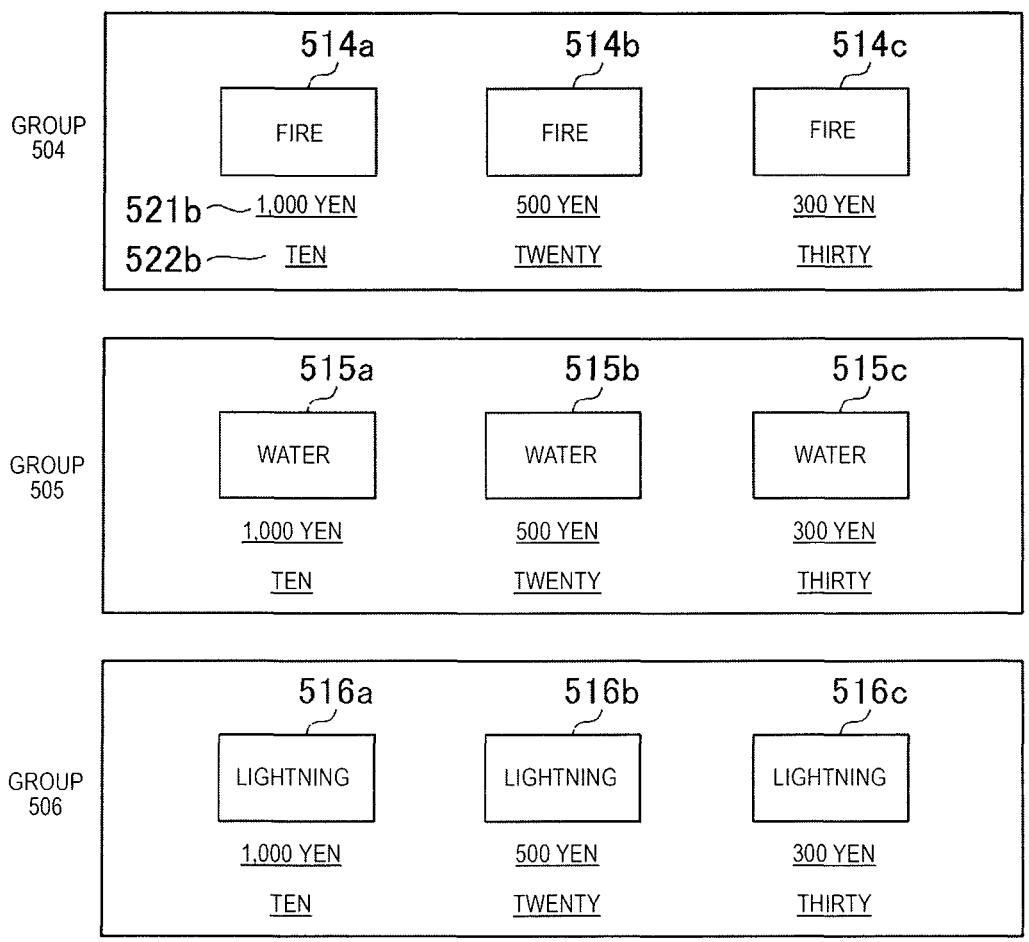
FIG. 15 is a diagram illustrating an example of group classification, the setting of game media capable of being given, and the setting of the upper limit of the number of game media capable of being given, which corresponds to at least one embodiment of the invention.

FIG. 15 is a diagram illustrating an example of group classification, the setting of game media capable of being given, and the setting of the upper limit of the number of game media capable of being given, which corresponds to at least one embodiment of the invention. In FIG. 15, users are classified into any of a group 504 in which users having selected "power of fire" are included, a group 505 in which users having selected "power of water" are included, and a group 506 in which users having selected "power of lightning" are included, on the basis of the users' selected power.

Virtual cards 514a to 514c relevant to "power of fire" are set in the group 504 to be in a state of being capable of being given to users. Here, the wording "virtual card relevant to power of fire" is, for example, a virtual card in which a virtual character belonging to power of fire is drawn, a virtual card having an effect of improving the ability of the virtual character belonging to power of fire, or the like. Virtual cards 515a to 515c relevant to "power of water" are set in the group 505 to be in a state of being capable of being given to users. Virtual cards 516a to 516c relevant to "power of lightning" are set in the group 506 to be in a state of being capable of being given to users. The descriptions of a necessary price field 521b and an upper limit field 522a have the same contents as described above, and thus are not given herein.

In FIG. 15, group classification, the setting of virtual cards capable of being given, and the setting of the upper limit of the number of virtual cards capable of being given are performed every day. In a case where a user's selected power is changed, the group classification is performed on the basis of power after the change. In the example of FIG. 15, since the setting of virtual cards capable of being given every day is performed, a virtual card consistent with a user's needs for the day such as, for example, a virtual card advantageous to an event held every day can be given to the user.

The group classification, the setting of virtual cards capable of being given, and the setting of the upper limit of the number of virtual cards capable of being given may be performed as in the example shown in FIG. 14, and may be performed as in example shown in FIG. 15. However, from the viewpoint of enhancing the taste of a game, it is preferable to perform both the example shown in FIG. 14 and the example shown in FIG. 15.

In addition, the group classification based on users' ranking as shown in FIG. 14 may be further performed on the groups 504 to 506 of FIG. 15. Users are classified into groups using a plurality of classification criteria, and thus the possibility of virtual cards consistent with users' needs being provided increases. In addition, it is possible to further enhance the strategy of a game by enhancing the importance of bargaining between users.

Information relating to virtual cards which are set to be in a state of being capable of being given in step S56 and the upper limit of the number of virtual cards capable of being given which are set in step S57 is transmitted from a server device to a user terminal (step S58), and the user terminal receives the information (step S59).

Next, virtual cards which are set to be in a state of being capable of being given to users, prices required for the virtual cards to be given, the upper limit of the number of virtual cards capable of being given, and the like are displayed on a display screen of the user terminal (step S60).

In a case where there is a desired virtual card among the displayed virtual cards, a user performs an operation such as, for example, a touch of a "purchase button" displayed on a touch panel. In a case where the user terminal accepts an operation relating to a request for giving a virtual card as described above (step S61), information relating to the request for giving a virtual card is transmitted from the user terminal to the server device (step S62), and the server device receives the information (step S63).

The information transmitted in step S62 may include information relating to the number of virtual cards that a user desires to be given, and one user is given a plurality of virtual cards. However, from the viewpoint of preventing one user from performing excessive buying, and preventing dissatisfaction from being vented from other users, a predetermined restriction may be imposed on the number of purchases per user.

Next, the server device determines whether the number of virtual cards requested to be given at a point in time a giving request is accepted does not reach the upper limit of a number capable of being given which is set in the virtual cards (step S64). In a case where it is determined to reach the upper limit (No in step S64), the virtual cards are not given (step S66), and the process return to step S60. In this case, for example, the effect of the virtual cards not being able to be given due to reaching the upper limit is displayed on the display screen of the user terminal.

In step S64, in a case where it is determined not to reach the upper limit (Yes in step S64), a process of giving a virtual card to a user is performed in exchange for charging or a game item which is given to the user in a case where charging is accepted (step S65). The process of giving a virtual card is performed by, for example, updating user information managed by the server device or the like so that information of a virtual card to be given is included in the user information. In this case, it is preferable to associate information indicating that the card is given by charging or the like with the information of a virtual card to be given, and to store the association in the server device. Next, the number of virtual cards given to users is counted, and the total number of given virtual cards and/or the remaining number of virtual cards capable of being given is calculated (step S67).

Information relating to the process of giving a virtual card or information relating to the total number of given virtual cards and/or the remaining number of virtual cards capable of being given are transmitted from the server device to the user terminal (step S68), and the user terminal receives the information (step S69).

Next, the total number of given virtual cards and/or the remaining number of virtual cards capable of being given is displayed on the display screen of the user terminal (step S70), and the process is terminated. It is preferable that the information relating to the total number of given virtual cards and/or the remaining number of virtual cards capable of being given is transmitted in step S67 at any time, for example, when a user selects a purchase screen of a virtual card, or the user performs an update request.

Figure 16:
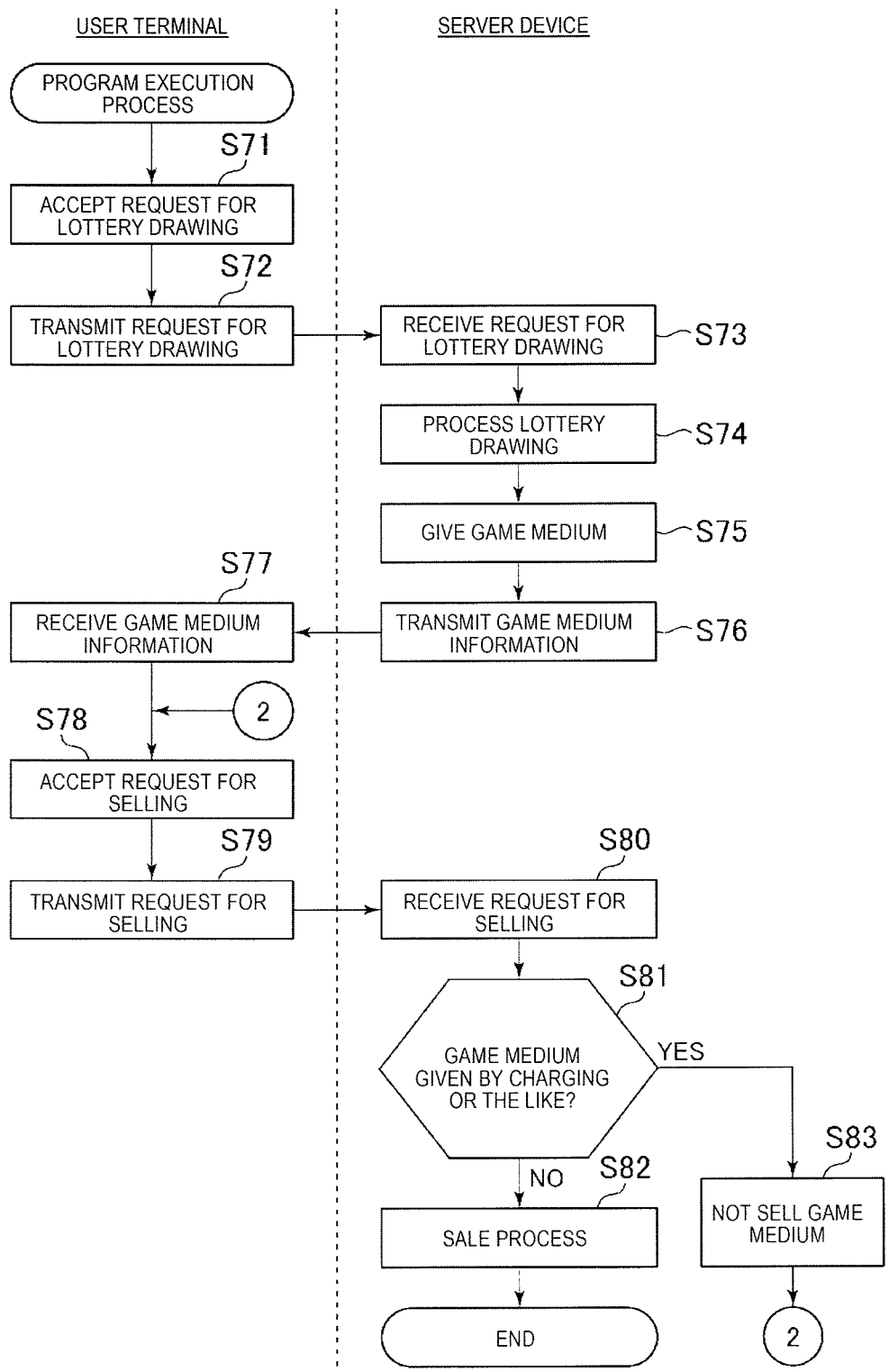
FIG. 16 is a flowchart of a program execution process which corresponds to at least one embodiment of the invention.

Next, an example of a program execution process relating to lottery drawing and sale of a game medium in the seventh embodiment of the invention will be described. FIG. 16 is a flowchart of a program execution process which corresponds to at least one embodiment of the invention.

First, in a case where a predetermined operation for requesting the lottery drawing of a game medium such as a user's touch of a "lottery drawing execution button" displayed on a touch panel is accepted by the user terminal (step S71), information relating to the request for lottery drawing is transmitted from the user terminal to the server device (step S72).

In the present embodiment, the lottery drawing of a game medium is performed by consuming virtual currency given to a user in accordance with the result of the user's game play. In addition, a virtual card which is set as a target for lottery drawing is different from the virtual card given to a user in exchange for the aforementioned charging or the like, and a case does not occur in which the virtual card given to a user in exchange for charging or the like is given by lottery drawing. With such a configuration, a differentiation between giving a virtual card based on charging or the like and giving a virtual card based on lottery drawing is achieved, and thus it is possible to improve the taste of a game.

The server device receives the information relating to request for lottery drawing (step S73). Next, lottery drawing is performed from a plurality of virtual cards in which winning probability is set in advance as targets for lottery drawing (step S74), and a winning virtual card and a user are associated with each other, and a process of giving a virtual card to a user is performed (step S75). In addition, it is preferable that, during the giving process, information indicating that a card is given in exchange for virtual currency is associated with information of a virtual card to be given, and the association is stored in the server device.

Information relating to a winning virtual card is transmitted from the server device to the user terminal (step S76). The user terminal receives the information (step S77), and the user can perform a game using the winning virtual card.

In a case where the winning virtual card is unnecessary for a user, the user sells the winning virtual card to the game system, and thus can obtain virtual currency. In a case where a predetermined operation for requesting to sell a virtual card such as a touch of a "selling button" displayed on the touch panel of the user terminal is accepted by the user terminal (step S78), information relating to the sale of a virtual card is transmitted from the user terminal to the server device (step S79).

The server device receives the information (step S80), and determines whether the virtual card requested to be sold is a virtual card given by charging or the like (step S81). In a case where it is determined to be a virtual card given by charging or the like (Yes in step S81), the sale of the virtual card is not performed (step S83), and the process returns to step S78. In this case, for example, the effect of the virtual card not being able to be sold is displayed on the display screen of the user terminal. In step S81, the virtual card given by charging or the like refers to a virtual card given to a user in step S65 described above and a virtual card given to a user by charging or the like in step S99 described later.

In step S81, in a case where it is determined not to be a virtual card given by charging or the like (No in step S81), the association of the virtual card with a user is erased, information of the virtual card is stored in a storage unit, a process of giving a user virtual currency of an amount determined as a selling price of the virtual card is performed (step S82), and the process is terminated.

Figure 17:
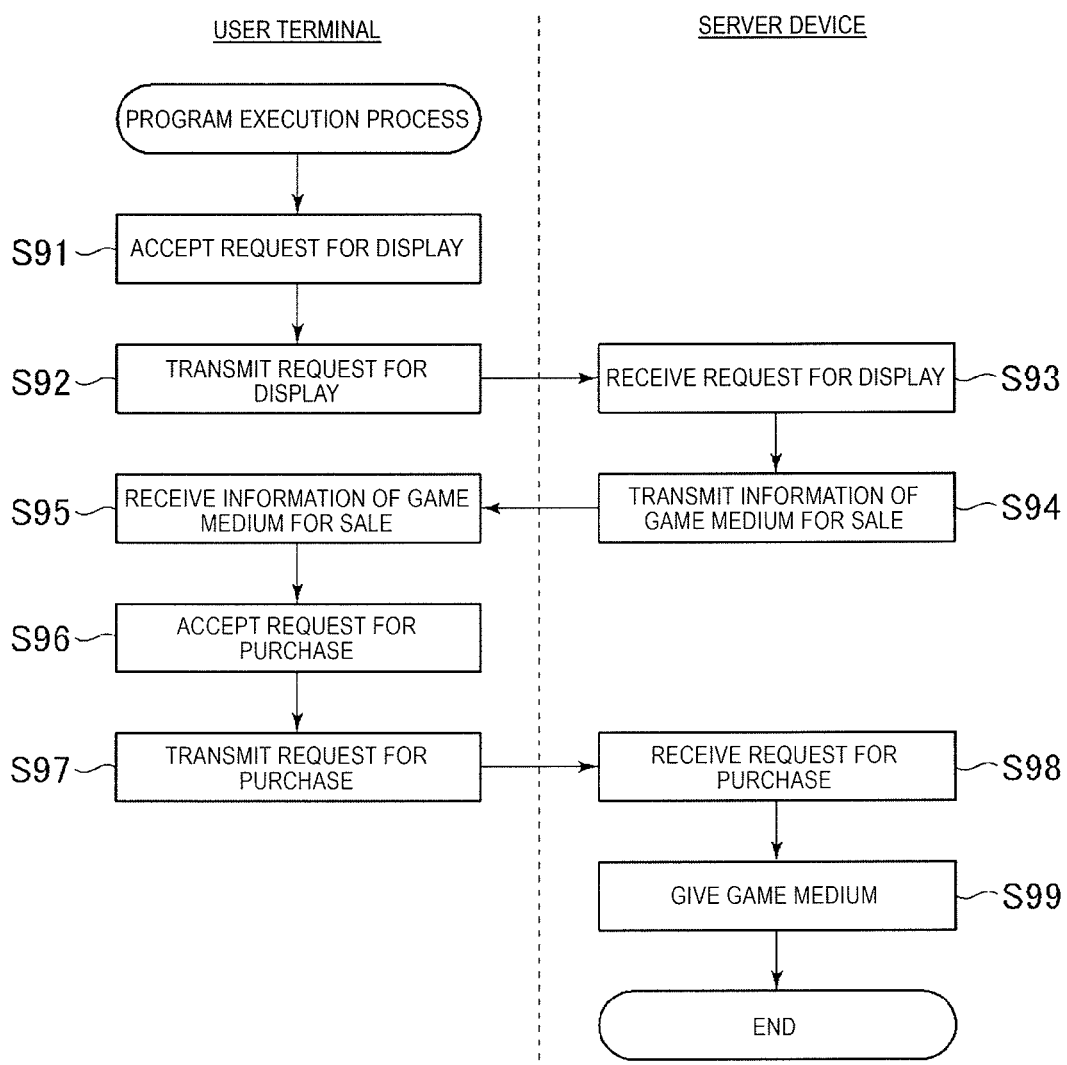
FIG. 17 is a flowchart of a program execution process which corresponds to at least one embodiment of the invention.

Next, an example of a program execution process relating to the purchase of the sold game medium in the seventh embodiment of the invention will be described. FIG. 17 is a flowchart of a program execution process which corresponds to at least one embodiment of the invention.

In the present embodiment, the virtual card sold to the game system as described above is sold to a user by the game system. The user can purchase a virtual card which is being sold, in exchange for charging or the like.

In a case where a request for displaying a virtual card sold by the game system, such as a touch of a predetermined button displayed on the touch panel of the user terminal is accepted by the user terminal (step S91), information relating to the request for displaying a virtual card is transmitted from the user terminal to the server device (step S92).

In a case where the information relating to a display request is received (step S93), the server device acquires information relating to a virtual card for sale from a storage unit, and transmits the information to the user terminal (step S94). Here, the virtual card for sale refers to a virtual card sold to the game system by a user and other users.

The user terminal receives the information relating to a virtual card for sale (step S95). Next, in a case where a virtual card for sale and a selling price are displayed on a display screen, and an operation relating to the selection of a virtual card and a request for purchasing the selected virtual card is accepted by the user terminal (step S96), information relating to the purchase of the virtual card is transmitted from the user terminal to the server device (step S97). The server device receives the information (step S98). Next, the server device associates the virtual card requested to be purchased by a user with the user, in exchange for charging or the like, performs a process of giving the card to the user (step S99), and the process is terminated. It is preferable that, during the giving process of step S99, information indicating giving by charging or the like is associated with information of a virtual card to be given, and the association is stored in the server device.

The virtual card given to a user in step S99 is originally a virtual card given in exchange for virtual currency, but is a virtual card given by charging or the like in step S99, and thus it is preferable that the virtual card is configured not to be capable of being sold to the game system.

In steps S91 to S99, an example has been described in which a virtual card is sold in exchange for charging or the like, but the sale of the virtual card may be performed in exchange for virtual currency. In a case of such a configuration, the virtual card sold in exchange for virtual currency can be sold to, for example, the game system.

In the seventh embodiment, in the terms "user terminal", "user", "server device", "game", "game medium", "type" of game medium, "give", "desire to be given", "predetermined upper limit", and "total number of game media given to a plurality of users", respective contents described in the first embodiment can be adopted in a necessary range. Further, in the seventh embodiment, in the term "predetermined period", the contents described in the second embodiment can be adopted in a necessary range. Further, in the seventh embodiment, in the terms "user's status" and "user's attribute", the contents described in the fourth embodiment can be adopted in a necessary range. In the seventh embodiment, in the term "display", the contents described in the fifth embodiment can be adopted in a necessary range.

In the seventh embodiment, the wording "game medium advantageous to a game play" refers to, for example, a game medium having high parameters used in a game, a game medium having a high effect when used, a game medium having a high degree of rare, or the like. The term "degree of rare" refers to an index indicating the scarcity of a game medium, and an opportunity available to a user decreases, for example, as the degree of rare of a game medium becomes higher. It is possible to make a design so that the parameters of a game medium, the upper limit of a level, or the like increases as the degree of rare of a game medium becomes higher. The term "virtual currency" refers to currency within a game, a point, an item, or the like given to a user in accordance with the result of the user's game play, and does not include a point or an item given by charging. The term "evaluation value" refers to, for example, a point or the like given to a user in accordance with the user's progress of a game or the status of the achievement of a predetermined object, and is used when ranking is determined. The term "predetermined ranking collection period" refers to a period in which a criterial evaluation value or the like when ranking is determined is collected, can be appropriately set with no particular restriction, for example, like 12 hours, 24 hours, a week, an event holding period during a game, or the like, and is not always the same period.

In an aspect of the seventh embodiment, a game medium that a user desires to be given among the game media which are set to be in a state of being capable of being given to the user is given to the user, it is not likely that the user is caused to feel dissatisfaction, possibly occurring in lottery drawing, that an objective game medium is not obtained even though several times of lottery drawing are performed.

In an aspect of the seventh embodiment, a predetermined upper limit applied to a plurality of users is set to the number of game media capable of being given to a user, and thus it is possible to request the user to make a determination of whether the game medium is given. In addition, bargaining with other users is effectuated, and thus it is possible to enhance the strategy of a game.

In an aspect of the seventh embodiment, a plurality of users are classified into a plurality of groups on the basis of ranking given to a user in accordance with the result of the user's game play, and thus it is possible to give a user a game medium commensurate with the degree of the user's progress of a game or ability, and to suppress a decrease in the user's interest in a game by enhancing the user's level of satisfaction. In addition, since the upper limit of a game medium is shared between users whose abilities become rivals soon in competition for ranking, bargaining with other users becomes more important, and thus it is possible to enhance the strategy of a game.

In an aspect of the seventh embodiment, by classifying a plurality of users into a plurality of groups on the basis of the users' ranking at the time of the termination of the predetermined ranking collection period, and resetting the type of game medium capable of being given to a user and the upper limit of the number of game media capable of being given to a plurality of users, it is possible to give a motive of attempting to acquire a higher ranking to a user, and to improve the taste of a game.

In an aspect of the seventh embodiment, by setting a game medium more advantageous to a game play to be in a state of being capable of being given to a group constituted by users having a high ranking rather than to a group constituted by users having a low ranking, it is possible to give a motive of attempting to acquire a higher ranking to a user, and to improve the taste of a game.

In an aspect of the seventh embodiment, the game medium which is set to be in a state of being capable of being given to a user is a game medium having parameters used in a game attached thereto. Therefore, a user can obtain, for example, a game medium important in acquiring a high ranking by progressing a game, regardless of lottery drawing depending on luck, and thus it is possible to improve a user's level of satisfaction.

In an aspect of the seventh embodiment, a game medium can be bought and sold between users through the game system. Therefore, a user sells an unnecessary game medium, and thus can purchase a necessary game medium. For example, a case may occur in which even a game medium unnecessary for a certain user is a game medium necessary for other users, and thus it is possible to improve a user's level of satisfaction by adopting the above configuration. In addition, as a result of an increase in the number of methods of acquiring a game medium, it is possible to improve the taste of a game.

In an aspect of the seventh embodiment, a game medium capable of being bought and sold between users through the game system is limited to a game medium obtained by lottery drawing. Thereby, a differentiation between giving a virtual card based on charging or the like and giving a virtual card based on lottery drawing is further achieved, and thus it is possible to improve the taste of a game. In addition, it is possible to prevent real money trade from being performed between users.

APPENDIX

In describing the embodiments above, the following inventions are disclosed so as to be embodied by those who have ordinary knowledge in the field belonging to the inventions.

[1] A non-transitory computer-readable recording medium having recorded thereon a game program, executed by a server device, in a game system which is realized by a plurality of user terminals operated by respective users and the server device capable of being connected to the plurality of user terminals through communication, the program causing the server device to function as: a game medium setter that sets one or more kinds of game media to be in a state of being capable of being given to a plurality of users; an upper limit setter that sets a predetermined upper limit to a total number of game media capable of being given to the plurality of users; a game medium giver that gives a user a game medium that the user desires to be given among the game media which are set by the game medium setter in a range not exceeding the predetermined upper limit; and a counter that counts a total number of game media given to the plurality of users or a remaining number of game media capable of being given to the plurality of users by the game medium giver.

[2] The non-transitory computer-readable recording medium according to [1], wherein the game medium setter resets one or more kinds of game media capable of being given to the plurality of users by a lapse of a predetermined period.

[3] The non-transitory computer-readable recording medium according to [1] or [2], wherein the upper limit setter resets an upper limit of the number of game media capable of being given to the plurality of users by a lapse of a predetermined period.

[4] The non-transitory computer-readable recording medium according to any one of [1] to [3], the program causing the server to further function as: a group classifier that classifies the plurality of users into a plurality of groups on the basis of a user's status and/or attribute, wherein the game medium setter sets a different game medium, for each group, to be in a state of being capable of being given to the user, and the upper limit setter sets a predetermined upper limit for each group and game medium.

[5] The non-transitory computer-readable recording medium according to [4], wherein the group classifier classifies the plurality of users into a plurality of groups on the basis of ranking given to a user in accordance with a result of the user's game play.

[6] The non-transitory computer-readable recording medium according to [5], wherein the group classifier classifies the plurality of users into a plurality of groups on the basis of a user's ranking at a termination of a predetermined ranking collection period, and one or more kinds of game media capable of being given to the plurality of users which is set by the game medium setter and the upper limit of the number of game media capable of being given to the plurality of users which is set by the upper limit setter are reset in a case where the predetermined ranking collection period is terminated.

[7] The non-transitory computer-readable recording medium according to [5] or [6], wherein the game medium setter sets a game medium more advantageous to a game play to be in a state of being capable of being given to a group constituted by users having a high ranking rather than to a group constituted by users having a low ranking.

[8] The non-transitory computer-readable recording medium according to any one of [1] to [7], wherein the game medium which is set to be in a state of being capable of being given to the plurality of users by the game medium setter is a game medium having parameters used in a game attached thereto.

[9] The non-transitory computer-readable recording medium according to any one of [1] to [8], wherein the game medium giver gives a game medium to a user in exchange for charging or a game item which is given to the user in a case where the charging is accepted.

[10] The non-transitory computer-readable recording medium according to any one of [1] to [7], the program causing the server device to further function as: a game medium buyer that exchanges a game medium owned by a user for virtual currency capable of being used within a game, in accordance with a selling request from the user; and a game medium seller that exchanges virtual currency owned by other user for the game medium sold by the user, in accordance with requests from other user.

[11] The non-transitory computer-readable recording medium according to [10], the program causing the server device to further function as: a game medium lottery drawer that performs lottery drawing in exchange for virtual currency owned by a user, and gives a game medium to the user on the basis of a lottery drawing result; and a game medium judger that judges the game medium given to the user by the game medium giver and the game medium given to the user by the game medium lottery drawer, wherein the game medium which is able to be exchanged for virtual currency by the game medium buyer is a game medium given to the user by the game medium lottery drawer or a game medium given to the user by the game medium seller.

[12] A server device having the game program according to any one of [1] to [11] installed therein.

[13] A game system which is realized in a plurality of user terminals operated by respective users and a server device capable of being connected to the plurality of user terminals through communication, the game system comprising: a game medium setter that sets one or more kinds of game media to be in a state of being capable of being given to a plurality of users; a game medium displayer that displays a game medium which is set to be in a state of being capable of being given to the plurality of users, to a user; an upper limit setter that sets a predetermined upper limit to a total number of game media capable of being given to the plurality of users; a game medium giver that gives a user a game medium that the user desires to be given among the game media which are set by the game medium setter in a range not exceeding the predetermined upper limit; a counter that counts a total number of game media given to the plurality of users or a remaining number of game media capable of being given to the plurality of users by the game medium giver; and a game medium number displayer that displays the total number or the remaining number to a user.

[14] A game program, executed by a user terminal, in a game system which is realized by a plurality of user terminals operated by respective users and a server device capable of being connected to the plurality of user terminals through communication, the program causing a user terminal having a function of receiving information from a server device to function as: a game medium displayer that displays a game medium which is set to be in a state of being capable of being given to a plurality of users to a user; and a game medium number displayer that displays a total number of game media or a remaining number of game media to the user, the server device including a game medium setter that sets one or more kinds of game media to be in a state of being capable of being given to the plurality of users, an upper limit setter that sets a predetermined upper limit to a number of game media capable of being given to the plurality of users, a game medium giver that gives the user a game medium that the user desires to be given among the game media which are set by the game medium setter in a range not exceeding the predetermined upper limit, and a counter that counts a total number of game media given to the plurality of users or a remaining number of game media capable of being given to the plurality of users by the game medium giver, wherein the information from the server device to the user terminal relates to the game medium capable of being given to the plurality of users, and the total number or the remaining number.

[15] A user terminal having the game program according to [14] installed therein.

[16] A game program control method, executed by a server device, in a game system which is realized by a plurality of user terminals operated by respective users and a server device capable of being connected to the plurality of user terminals through communication, the method comprising in the server device: a game medium setting step of setting one or more kinds of game media to be in a state of being capable of being given to a plurality of users; an upper limit setting step of setting a predetermined upper limit to a number of game media capable of being given to the plurality of users; a game medium giving step of giving a user a game medium that the user desires to be given among the game media which are set in the game medium setting step in a range not exceeding the predetermined upper limit; and a count step of counting the total number of game media given to the plurality of users or the remaining number of game media capable of being given to the plurality of users in the game medium giving step.

[17] A game control method which is realized in a game system including a plurality of user terminals operated by respective users and a server device capable of being connected to the plurality of user terminals through communication, the method comprising: a game medium setting step of setting one or more kinds of game media to be in a state of being capable of being given to a plurality of users; a game medium display step of displaying a game medium which is set to be in a state of being capable of being given to the plurality of users, to a user; an upper limit setting step of setting a predetermined upper limit to a number of game media capable of being given to the plurality of users; a game medium giving step of giving a user a game medium that the user desires to be given among the game media which are set in the game medium setting step in a range not exceeding the predetermined upper limit; a count step of counting the total number of game media given to the plurality of users or the remaining number of game media capable of being given to the plurality of users in the game medium giving step; and a game medium number display step of displaying the total number or the remaining number to the user.

What is claimed is:

1. A non-transitory computer-readable recording medium having recorded thereon a game program executed by a server having a processor and a communication interface, in a game system which is realized by a plurality of user terminals each including a communication interface communicating with the communication interface of the server via a communication interface, and a display, operated by respective users terminals and the server, the program, when executed by the server, causes the server to perform operations comprising:
   setting one or more kinds of game media, comprising digital content representing objects displayable on the displays of the plurality of user terminals, into a state in which the objects are transmittable to and displayable on the displays of the plurality of user terminals;
   setting a predetermined upper limit to a number of objects represented by the digital content transmittable to and displayable on the displays of the plurality of user terminals;
   transmitting objects represented by the digital content over the communication network from the communication interface of the server to the displays of the plurality of user terminals, as long as the total number of the objects transmitted to the displays of the plurality of user terminals is no greater than the set predetermined upper limit;
   determining the total number of objects transmitted to the displays of the plurality of user terminals over the communication network from the communication interface of the server;
     wherein in response to a request transmitted from one of the plurality of user terminals to the server over the communication network for transmitting one of the objects from the server to the one of the plurality of user terminals, the processor refrains from transmitting the one of the objects over the communication network via the communication interface of the server to the one of the plurality of user terminals when the transmitting of the one of the objects over the communication network via the communication interface of the server to the one of the plurality of user terminals would cause the total number of objects transmitted to the displays of the plurality of user terminals over the communication network via the communication interface of the server to exceed the predetermined upper limit;
   displaying the one of the objects on the display of the one of the user terminals when
     the one of the objects is set in the state in which the one of the objects is transmittable to and displayable on the displays of the plurality of user terminals, and
     the one of the objects has been transmitted from the communication interface of the server device over the communication network to the communication interface of the one of the user terminals;
   displaying on the display of the one of the user terminals the determined total number of objects transmitted from the communication interface of the server over the communication network to the plurality of user terminals or the remaining number of objects that have been set to be transmittable and displayable by the processor but have not yet been transmitted from the server and displayed by the plurality of user terminals; and
   displaying on the display of one of the user terminals the determined total number of objects transmitted from the server or the remaining number of objects transmittable to the plurality of user terminals in response to the determination that the total number of objects transmitted to the user terminals is no greater than the predetermined upper limit,
   wherein the set upper limit is an upper limit on the number of objects capable of being transmitted from the server to the plurality of user terminals and is shared between user terminals.

2. The non-transitory computer-readable recording medium according to claim 1,
   wherein the setting of the predetermined upper limit includes resetting the one or more kinds of game media capable of being transmitted to the plurality of user terminals by a lapse of a predetermined period.

3. The non-transitory computer-readable recording medium according to claim 1,
   wherein the setting of the predetermined upper limit includes resetting the predetermined upper limit of the number of game media capable of being transmitted to the plurality of user terminals by a lapse of a predetermined period.

4. The non-transitory computer-readable recording medium according to claim 1,
   wherein the operations further comprise:
   classifying the plurality of user terminals into a plurality of groups on the basis of at least one of status and attributes of a plurality of users using the plurality of user terminals,
   wherein the setting of the one or more kinds of game media includes setting a different game medium, for each group, to be in a state of being capable of being transmitted to the plurality of user terminals, and
   the setting of the predetermined upper limit includes setting a predetermined upper limit for each group and game medium of the one or more kinds of game media.

5. The non-transitory computer-readable recording medium according to claim 4, wherein the classifying includes classifying the plurality of user terminals into a plurality of groups on the basis of ranking given to each user of the plurality of users in accordance with a result of the each user's game play.

6. The non-transitory computer-readable recording medium according to claim 5,
wherein the classifying includes classifying the plurality of user terminals into a plurality of groups on the basis of the each user's ranking at a termination of a predetermined ranking collection period, and
the predetermined upper limit is reset in a case where the predetermined ranking collection period is terminated.

7. The non-transitory computer-readable recording medium according to claim 5,
wherein the setting of the one or more kinds of game media includes setting a game medium more advantageous to a game play to be in a state of being capable of being transmitted to a group constituted by user terminals whose users have a high ranking rather than to a group constituted by user terminals whose users have a low ranking lower than the high ranking.

8. The non-transitory computer-readable recording medium according to claim 1,
wherein a game medium of the one or more kinds of game media which is set to be in a state of being capable of being transmitted to the plurality of user terminals is a game medium having parameters used in a game attached thereto.

9. The non-transitory computer-readable recording medium according to claim 1,
wherein the transmitting includes transmitting a game medium of the one or more kinds of game media to the one of the user terminals in exchange for charging of a game item which is transmitted to the one of the user terminals in a case where the charging is accepted.

10. The non-transitory computer-readable recording medium according to claim 1,
wherein the operations further comprise:
exchanging a game medium of the one or more kinds of game media owned by a user of the one of the plurality of user terminals for virtual currency capable of being used within a game, in accordance with a selling request from the user; and
exchanging virtual currency owned by another user for the game medium sold by the user, in accordance with request from the other user.

11. The non-transitory computer-readable recording medium according to claim 10,
wherein the operations further comprise:
performing a lottery drawing in exchange for the virtual currency owned by the user, and transmitted a lottery game medium to the user on the basis of a lottery drawing result; and
judging a game medium of the one or more kinds of game media transmitted to the user and the lottery game medium transmitted to the user,
wherein a game medium which is able to be exchanged for the virtual currency is a lottery game medium transmitted to the user or a game medium sold to the user.

12. A game system comprising:
a plurality of user terminals each including
a communication interface, and
a display; and
a server including
a communication interface communicating with the communication interfaces of the plurality of user terminals via a communication network, and
a processor,
wherein the processor of the server is configured to:
set one or more kinds of game media, comprising digital content representing objects displayable on displays of the plurality of user terminals, into a state in which the objects are transmittable to and displayable on the displays of the plurality of user terminals;
set a predetermined upper limit to a number of objects represented by the digital content transmittable to and displayable on the displays of the plurality of user terminals;
transmit objects represented by the digital content over the communication network from the communication interface of the server to the displays of the plurality of user terminals, as long as the total number of the objects transmitted to the displays of the plurality of user terminals is no greater than the set predetermined upper limit;
determine the total number of objects transmitted to the displays of the plurality of user terminals over the communication network from the communication interface of the server; and
in response to a request transmitted from one of the plurality of user terminals to the server over the communication network for transmitting one of the objects from the server to the one of the plurality of user terminals, the processor refrains from transmitting the one of the objects over the communication network via the communication interface of the server to the one of the plurality of user terminals when the transmitting of the one of the objects over the communication network via the communication interface of the server to the one of the plurality of user terminals would cause the total number of objects transmitted to the displays of the plurality of user terminals over the communication network via the communication interface of the server to exceed the predetermined upper limit modify a probability of receiving a game medium upon reaching the set upper limit;
display the one of the objects on the display of the one of the user terminals when
the one of the objects is set in the state in which the one of the objects is transmittable to and displayable on the displays of the plurality of user terminals, and
the one of the objects has been transmitted from the communication interface of the server over the communication network to the communication interface of the one of the user terminals;
display on the display of the one of the user terminals the determined total number of objects transmitted from the communication interface of the server over the communication network to the plurality of user terminals or the remaining number of objects that have been set to be transmittable and displayable by the processor but have not yet been transmitted from the server and displayed by the plurality of user terminals, and
display on the display of the one of the user terminals the determined total number of objects transmitted from the server or the remaining number of objects transmittable to the plurality of user terminals in response to the determination that the total number of objects transmitted to the user terminals is no greater than the predetermined upper limit,
wherein the set upper limit is an upper limit on the number of objects capable of being transmitted from the server to the plurality of user terminals and is shared between users.

13. A non-transitory computer-readable recording medium having recorded thereon a game program executed by a user terminal, in a game system which is realized by a plurality of user terminals each including a communication interface and a display and a server including a communication interface communicating with the communication interfaces of the plurality of user terminals via a communication network, and a processor configured to set one or more kinds of game media, comprising digital content representing objects displayable on displays of the plurality of user terminals, into a state in which the objects are transmittable to and displayable on the displays of the plurality of user terminals, the program, when executed by a processor of the one of the user terminals is configured to receive information from the server, causing the one of the user terminals to perform operations comprising:

displaying one of the objects on the display of the one of the user terminals when
one of the objects is set in the state in which the one of the objects is transmittable to and displayable on the displays of the plurality of user terminals, and
the one of the objects has been transmitted from the communication interface of the server over the communication network to the communication interface of the one of the user terminals;

displaying on the display of the one of the user terminals a determined total number of objects transmitted from the communication interface of the server over the communication network to the plurality of user terminals or a remaining number of objects that have been set to be transmittable and displayable by the processor but have not yet been transmitted from the server and displayed by the plurality of user terminals, and displaying on the display of one of the user terminals the determined total number of objects transmitted from the server or the remaining number of objects transmittable to the plurality of user terminals in response to a determination that the total number of objects transmitted to the user terminals is no greater than a predetermined upper limit, the processor of the server also being configured to:

the predetermined upper limit to a number of objects represented by the digital content transmittable to and displayable on the displays of the plurality of user terminals;

transmit objects represented by the digital content over the communication network from the communication interface of the server to the displays of the plurality of user terminals, as long as the total number of the objects transmitted to the displays of the plurality of user terminals is no greater than the predetermined upper limit;

determine the total number of objects transmitted to the displays of the plurality of user terminals over the communication network from the communication interface of the server; and in response to a request transmitted from the one of the plurality of user terminals to the server over the communication network for transmitting one of the objects from the server to the one of the plurality of user terminals, the processor refrains from transmitting the one of the objects over the communication network via the communication interface of the server to the one of the plurality of user terminals when the transmitting of the one of the objects over the communication network via the communication interface of the server to the one of the plurality of user terminals would cause the total number of objects transmitted to the displays of the plurality of user terminals over the communication network via the communication interface of the server to exceed the predetermined upper limit, and wherein the set upper limit is an upper limit on the number of objects capable of being transmitted from the server to the plurality of user terminals and is shared between users.

* * * * *

UNITED STATES PATENT AND TRADEMARK OFFICE
CERTIFICATE OF CORRECTION

PATENT NO. : 10,632,377 B2  
APPLICATION NO. : 15/678563  
DATED : April 28, 2020  
INVENTOR(S) : K. Fujinaga et al.

Page 1 of 1

It is certified that error appears in the above-identified patent and that said Letters Patent is hereby corrected as shown below:

In the Claims

Column 30, Lines 41-43 (Claim 12, Lines 46-48), please delete "modify a probability of receiving a game medium upon reaching the set upper limit".

Column 32, Line 6 (Claim 13, Line 42), please insert --set-- before "the".

Signed and Sealed this  
Twenty-second Day of September, 2020

Andrei Iancu  
*Director of the United States Patent and Trademark Office*